United States Patent
Gordon et al.

(10) Patent No.: US 6,643,034 B1
(45) Date of Patent: *Nov. 4, 2003

(54) FACSIMILE TELECOMMUNICATIONS SYSTEM AND METHOD

(75) Inventors: Richard J. Gordon, Los Angeles, CA (US); James R. Kennedy, Tucson, AZ (US)

(73) Assignee: Audiofax IP, LLC, Marietta, GA (US)

( * ) Notice: Subject to any disclaimer, the term of this patent is extended or adjusted under 35 U.S.C. 154(b) by 340 days.

This patent is subject to a terminal disclaimer.

(21) Appl. No.: 09/686,306

(22) Filed: Oct. 11, 2000

Related U.S. Application Data

(63) Continuation of application No. 08/780,690, filed on Jan. 8, 1997, which is a continuation of application No. 08/395,062, filed on Feb. 27, 1995, now abandoned, which is a continuation of application No. 08/371,842, filed on Jan. 12, 1995, now Pat. No. 5,459,584, which is a continuation of application No. 07/955,833, filed on Oct. 2, 1992, now Pat. No. 5,291,302, which is a continuation of application No. 07/654,181, filed on Feb. 12, 1991, now abandoned, which is a continuation-in-part of application No. 07/248,798, filed on Sep. 22, 1988, now Pat. No. 4,994,926.

(51) Int. Cl.$^7$ ................................................. H04N 1/00
(52) U.S. Cl. ........................ 358/434; 358/400; 358/402; 358/407; 358/435; 358/436; 358/440; 358/405
(58) Field of Search ................................. 358/400, 401, 358/402, 404, 407, 403, 434, 435, 436, 438, 440, 442, 405, 439

(56) References Cited

U.S. PATENT DOCUMENTS

| | | | |
|---|---|---|---|
| 3,594,495 A | 7/1971 | Bond | 178/5 |
| 3,641,432 A | 2/1972 | Bond | 325/4 |

(List continued on next page.)

FOREIGN PATENT DOCUMENTS

| | | |
|---|---|---|
| CA | 1329852 | 5/1994 |
| EP | 3230609 | 2/1984 |

(List continued on next page.)

OTHER PUBLICATIONS

Audiofax, Inc.—Audiofax, Inc. Proposal for BellSouth Advanced Networks—Fax Automated & On–Demand Distribution Methods—Oct. 6, 1988.

(List continued on next page.)

*Primary Examiner*—Jerome Grant, II
(74) *Attorney, Agent, or Firm*—Womble Carlyle Sandridge & Rice, PLLC; Louis T. Isaf

(57) ABSTRACT

A system and method for facilitating facsimile transmissions has one or more store and forward facilities, each associated with a plurality of subscriber facsimile machines, typically coupled over the switched telephone network. The store and forward facilities include a computer for controlling operations and mass data storage equipment. A subscriber to the system delivers an outgoing facsimile message to the store and forward facility with which it is associated, which records the fax message together with data as to originating facsimile machine and destination facsimile machine. The store and forward facility then delivers the facsimile message to the intended receiver facsimile machine, either directly or through another store and forward facility. If unsuccessful on an initial attempt, the store and forward facility periodically retrys to send the facsimile message. The system also provides spooling of all facsimile messages for an intended receiver machine, which are all transmitted upon making connection with the receiver machine. Subscriber mailboxes are provided as part of the mass storage, which can be accessed by a subscriber to have his messages delivered to any facsimile machine he designates. Secure facsimile transmission is achieved through use of subscriber PIN numbers. Broadcasting, redirecting messages and cost accounting can also be achieved by the system and method.

88 Claims, 10 Drawing Sheets

U.S. PATENT DOCUMENTS

| | | | |
|---|---|---|---|
| 3,728,486 A | 4/1973 | Kramer | 179/7.1 |
| 3,920,896 A | 11/1975 | Bishop et al. | 178/26 |
| 3,993,862 A | 11/1976 | Karr | 178/6 |
| 3,995,106 A | 11/1976 | Wern et al. | 178/6.8 |
| 4,058,672 A | 11/1977 | Crager et al. | 178/3 |
| 4,058,838 A | 11/1977 | Crager et al. | 358/257 |
| 4,091,424 A | 5/1978 | Widergren | 358/260 |
| 4,106,060 A | 8/1978 | Chapman, Jr. | 358/256 |
| 4,115,765 A | 9/1978 | Hartke | 340/324 |
| 4,207,598 A | 6/1980 | Reich et al. | 358/257 |
| 4,245,257 A | 1/1981 | Yamazaki et al. | 358/260 |
| 4,249,216 A | 2/1981 | Kanda | 358/257 |
| 4,255,619 A | 3/1981 | Saito | 179/2 |
| 4,326,098 A | 4/1982 | Bouricius et al. | 178/22.08 |
| 4,327,251 A | 4/1982 | Fomenko et al. | 179/1 |
| 4,340,783 A | 7/1982 | Sugiyama et al. | 179/2 |
| 4,371,752 A | 2/1983 | Matthews et al. | 179/7.1 |
| 4,432,020 A | 2/1984 | Onose et al. | 358/257 |
| 4,491,873 A | 1/1985 | Takayama | 358/256 |
| 4,500,751 A | 2/1985 | Darland et al. | 179/2 |
| 4,504,868 A | 3/1985 | Hasuike et al. | 358/280 |
| 4,513,390 A | 4/1985 | Walter et al. | 364/900 |
| 4,518,989 A | 5/1985 | Yahiki et al. | 358/86 |
| 4,523,055 A | 6/1985 | Hohl et al. | 179/2 |
| 4,549,047 A | 10/1985 | Brian et al. | 179/18 |
| 4,571,699 A | 2/1986 | Herzog et al. | 364/900 |
| 4,573,083 A | 2/1986 | Shimizu | 358/257 |
| 4,581,656 A | 4/1986 | Wada | 358/257 |
| 4,584,434 A | 4/1986 | Hashimoto | 179/2 |
| 4,585,906 A | 4/1986 | Matthews et al. | 179/18 |
| 4,587,633 A | 5/1986 | Wang et al. | 364/900 |
| 4,602,129 A | 7/1986 | Matthews et al. | 179/18 |
| 4,613,907 A | 9/1986 | Yoshimoto et al. | 358/257 |
| 4,614,978 A | 9/1986 | Doster et al. | 358/263 |
| 4,635,253 A | 1/1987 | Urui et al. | 370/67 |
| 4,635,255 A | 1/1987 | Clark et al. | 370/110.1 |
| 4,642,697 A | 2/1987 | Wada | 358/257 |
| 4,646,160 A | 2/1987 | Iizuka et al. | 358/257 |
| 4,652,700 A | 3/1987 | Matthews et al. | 379/89 |
| 4,652,933 A | 3/1987 | Koshiishi | 358/256 |
| 4,654,718 A | 3/1987 | Sueyoshi | 358/257 |
| 4,660,218 A | 4/1987 | Hoshimoto | 379/93 |
| 4,667,248 A | 5/1987 | Kanno | 358/257 |
| 4,706,126 A | 11/1987 | Kondo | 358/257 |
| 4,713,837 A | 12/1987 | Gordon | 379/93 |
| 4,748,656 A | 5/1988 | Gibbs et al. | 379/93 |
| 4,763,317 A | 8/1988 | Lehman et al. | 370/58 |
| 4,769,719 A | 9/1988 | Endo | 358/296 |
| 4,837,798 A | 6/1989 | Cohen et al. | 379/88 |
| 4,847,891 A | 7/1989 | Kotani | 379/88 |
| 4,866,758 A | 9/1989 | Heinzelmann | 379/94 |
| 4,870,678 A | 9/1989 | Adachi | 379/100 |
| 4,893,333 A | 1/1990 | Baran et al. | 379/100 |
| 4,905,273 A | 2/1990 | Gordon et al. | 379/93 |
| 4,914,586 A | 4/1990 | Swinehart et al. | 364/200 |
| 4,918,722 A | 4/1990 | Duehren et al. | 379/100 |
| 4,922,518 A | 5/1990 | Gordon et al. | 379/57 |
| 4,935,955 A | 6/1990 | Neudorfer | 379/100 |
| 4,941,170 A | 7/1990 | Herbst | 379/100 |
| 4,942,599 A | 7/1990 | Gordon et al. | 379/93 |
| 4,964,154 A | 10/1990 | Shimotono | 379/100 |
| 4,967,288 A | 10/1990 | Mizutori et al. | 358/425 |
| 4,969,184 A | 11/1990 | Gordon et al. | 379/100 |
| 4,974,254 A | 11/1990 | Perine et al. | 379/100 |
| 4,994,926 A | 2/1991 | Gordon et al. | 358/400 |
| 5,003,575 A | 3/1991 | Chamberlin et al. | 379/89 |
| 5,008,926 A | 4/1991 | Misholi | 379/89 |
| 5,014,300 A | 5/1991 | Harvath et al. | 379/100 |
| 5,065,254 A | 11/1991 | Hishida | 358/400 |
| 5,095,445 A | 3/1992 | Sekiguchi | 364/514 |
| 5,127,047 A | 6/1992 | Bell et al. | 379/100 |
| 5,136,634 A | 8/1992 | Rae et al. | 379/100 |
| 5,193,110 A | 3/1993 | Jones et al. | 379/94 |
| 5,224,156 A | 6/1993 | Fuller et al. | 379/100 |
| 5,291,302 A | 3/1994 | Gordon et al. | 358/400 |
| 5,459,584 A | 10/1995 | Gordon et al. | 358/434 |

FOREIGN PATENT DOCUMENTS

| | | | |
|---|---|---|---|
| EP | 0236803 | 2/1987 | |
| GB | 2211698 | 7/1989 | |
| JP | 56-89167 | 7/1981 | |
| JP | 574653 | 1/1982 | |
| JP | 59-133073 | 2/1982 | |
| JP | 5738055 | 3/1982 | |
| JP | 57-119537 | 7/1982 | |
| JP | 57-119541 | 7/1982 | |
| JP | 57-184362 | 11/1982 | |
| JP | 57-192167 | 11/1982 | |
| JP | 58-138148 | 8/1983 | |
| JP | 58-138162 | 8/1983 | |
| JP | 58-175342 | 10/1983 | |
| JP | 58-186253 | 10/1983 | |
| JP | 58-187055 | 11/1983 | |
| JP | 59-015387 | 1/1984 | |
| JP | 5927664 | 2/1984 | |
| JP | 5930352 | 2/1984 | |
| JP | 5999846 | 6/1984 | |
| JP | 59-117845 | 7/1984 | |
| JP | 59-196647 | 11/1984 | |
| JP | 59-196648 | 11/1984 | |
| JP | 59-214365 | 12/1984 | |
| JP | 59-214366 | 12/1984 | |
| JP | 59-231964 | 12/1984 | |
| JP | 6046647 | 3/1985 | |
| JP | 6081963 | 5/1985 | |
| JP | 60-93875 | 5/1985 | |
| JP | 6096945 | 5/1985 | |
| JP | 58-165152 | 5/1985 | |
| JP | 60-119161 | 6/1985 | |
| JP | 60-119164 | 6/1985 | |
| JP | 60-134554 | 7/1985 | |
| JP | 60-134656 | 7/1985 | |
| JP | 60-178765 | 9/1985 | |
| JP | 60-197059 | 10/1985 | |
| JP | 62-128651 | 11/1985 | |
| JP | 60-248057 | 12/1985 | |
| JP | 6113727 | 1/1986 | |
| JP | 59-133711 | 1/1986 | |
| JP | 6160060 | 3/1986 | |
| JP | 61-128651 | 6/1986 | |
| JP | 63-133753 | 6/1986 | |
| JP | 61-154258 | 7/1986 | |
| JP | 6253545 | 3/1987 | |
| JP | 62-132464 | 6/1987 | |
| JP | 62-135061 | 6/1987 | |
| JP | 62-141847 | 6/1987 | |
| JP | 62-199162 | 9/1987 | |
| JP | 62-204654 | 9/1987 | |
| JP | 6364464 | 3/1988 | |
| JP | 63-052539 | 3/1988 | H04L/11/20 |
| JP | 63-105544 | 5/1988 | |
| JP | 63-187941 | 8/1988 | |
| JP | 63-221736 | 9/1988 | |
| JP | 63-290041 | 11/1988 | |
| JP | 641364 | 1/1989 | |
| JP | 6412657 | 1/1989 | |
| JP | 1258526 | 10/1989 | |
| JP | 25658 | 1/1990 | |
| JP | 2268535 | 11/1990 | |

OTHER PUBLICATIONS

Audiofax, Inc.—System Specifications for BellSouth Advanced Networks—Fax Automated & On–Demand Distribution Methods—Nov. 28, 1988.
Comverse Technology, Inc.—Trilogue Message Management System—12/87—pp. 1–5.
Comverse Technology, Inc.—Trilogue Hardware Architecture—Jan., 1987.
Comverse Technology, Inc.—Trilogue Message Management Systems—No Date.
International 100—North American International Business—Jan., 1991.
Comverse & Ascom Create a Voice & Fax Messaging Strategic Alliance—Brian Willshire No Date.
ComverseActions—Fourth Quarter 1990—Comverse Technology, Inc.
Voice Messaging Comes of Age in Today's Mobile Communications Market—Feb. 1988.
Trilogue Voicelogue User Guide—Comverse Technologies, Inc.—Dec., 1988.
Trilogue Voicelogue User Guide—Comverse Technologies, Inc.—Dec., 1988.
Interfax's Unique Fax Service—pp. 58–59—May, 1990.
Information Disclosure Statement Ser. No. 192,839—Oct., 1988.
We're Making Headlines With the Marriage of The Century—SpectraFax Corp.—No Date.
The 3M FaxXchange Networks Switch Turns your Fax Network into A Highly Efficient High Volume Communicator—No Date.
3M FaxXchange Market & Product Summary Version 1.0—Oct. 12, 1990.
US Fax—US Faxsys—Your Business—No Date.
Fax Fever Slams Business Hard—Insight Magazine—Aug. 22, 1988—pp. 8–12.
The Fax Network (ICM) Product Specification—May 11, 1992.
AT&T Fax Products & Services Speed The Written Message—04/89—No. 2—pp. 12–17.
Mitel Enterprises—Providing Business Solutions!—Smart–1 SPC Fax Dialer—11/91.
SmarterFax Mailbox Manager Brochure—No Date.
ATR 300 Telephone Line Powered Call Controller—Hy–Tek Controllers, Inc.—1993.
CCITT Red Book vol. VIII—Fascile VIII.7—Data Communication Networks Message Handling Systems—Oct., 1984.
CCITT Red Book vol. II—Fascicle 11.5 Telematic Services: Operations & Quality of Service Oct., 1984.
Electronic Mail Standards to Get Rubber–Stamped & Go Worldwide—Data Communications May 1984—pp. 159–168.
Development of a Public Facsimile Communication System Using Storage & Conversion Techniques—Kamae—1990 IEEE—pp. 19.4.1–19.4.5.
Public Facsimile Communication Network—Takahiko Kamae—1982 IEEE—pp. 47–51.
Advanced Facsimile Communication Network—Masayoshi Ejiri—pp. 176–183—07/83.
A Message Handling System For Public Networks—Nakayama et al.—1983—pp. 103–111.
Facsimile Communication in Digital Network—Ejiri et al.—Jan. 1984—pp. 19–27.
Enhanced Message Handling System for In–House Use—Haruta et al.—Dec. ,1985 pp. 42.4.1–42.4.6.

Present Situation & Future Trends of Communication Processing Technologies—Hideton Hata—pp. 228–237—Oct., 1986.
Enhanced Facsimile Communication Network—Hiroshi Katsuki—pp. 30–36—01/86.
IEEE/IEICE Global Telecommunications Conference 1987—Conference Record Vo. 3 of 3 Nov. 15–18, 1987—Japan.
International Conference on Communication—Jun. 14–18, 1981—Conference Record vol. 2 of 4—Development of Fax Communication System For Pocket Switched Data Network.
Experimental Facsimile Communication System on Packet Switched Data Network—IEEE Transactions on Communication—vol. Com—29 No. 12—Dec. 1981.
A Facsimile Mail System As Basis For Integrated Mail System—Ozawa et al.—May, 1984.
Planning A Nation–Wide Facsimile Store–And–Forward Network—1981 IEEE—pp. F5.1.1–F5.1.5.
AutoFax: A Store–And–Forward Facsimile System—vol. 71—Jan. 1979.
FaxPak Store–And–Forward Facsimile Transmission Service Electrical Communication—vol. 54 No. 3, 1979.
3.3 International Facsimile Communications Over Packet Switched Network—1983—Hiroichi Teramura—pp. 239–247.
Recent Advances in Facsimile Communications—Yasuhiro Yamazaki—pp. 118–124 1985.
Development of A Multi–Media MHS Based on CCITT X.400 Recommendations—pp. 305–319—1986.
3.6 Electronic Mail Systems—Ketsuke Tomaru—pp. 283–290—1983.
PBX/LAN The Architecture of Meridian SL Integrated Services Networks—1985 pp. 27–33.
PBX–Based Lans: Lower Cost Per Terminal Connection Computer Design—02/84 pp. 191–199.
LAN's—Partners With Voice/Data Systems—Technical Note 09/84—pp. 64g–64p.
While–You–Wait Fax—Newsweek—John Wojno with Robina Gibb—No Date.
An Answering Maching That Really Gives Answers—Business Week—Oct. 9, 1989.
InBound/OutBound—Special Request By SpectraFax—Sep., 1989.
MCI Safe Store–And–Forward Message–Switching System User's Guide—MCI Communication Corp. 05/87.
RCA Fax Forward International Facsimile Service Overview—RCA Global Communications, Inc.—Sep., 1987.
RCA Tries Again With FaxForward—Information Week—Sep. 21, 1987—p. 48.
Design For Fascimile Storage & Conversion Processing in STOC—201—Electrical Communication Laboratories—vol. 33, No. 1, 1985.
Transcript by Paul Ehrlich—Oct. 3, 1989—Video Monitoring Services of America, Inc.
Facsimile Data Converter Applied to Various Data Communications Services by Masao Setoguchi—Jan. 1987.
Japan is Making INS A Reality—pp. 64–81—Telephony—Oct. 24, 1983.
Integrated Digital Switching System With Queuing Storage Facility—1980—IEEE.
Meridian SL Information Services—Telesis 1985—pp. 13–19.

IDP Report—vol. 10, No. 15—Sep. 15, 1989—Knowledge Industry Publications, Inc.

Local Entrepreneur's Invention Weds 3 Modern Conveniences—Lorna Collier—No Date.

Making Databases Available to Computer Illiterates by Jack Lesar—Dec. 13, 1989.

Just the Fax, Ma'am—Belvidere Native Pioneers Information Service—Belvidere Daily Republican—Dec. 5, 1989.

For Columnist, Getting Fax Has a New Meaning—Southtown Economist—Dec. 8, 1989.

NEAX 2400 IMS FMM (Facsimile Mail Module) Station User's Guide—07/85 NEC Corp.

ITT Inaugurates FAXPAK—Business Communication Review—Nov./Dec. 1979 pp. 29–31.

FAX/PAK Facsimile Transmission Service Universal Compatibility Between Fax Machines.

Flexible Facsimile Transmission—ITT Domestic Transmission Systems, Inc. 03/90 pp. 39–42.

3 Jeudi 24—09/81—Interconnection of the Teletex & Other Services.

Internal Memo From Mike Donnenfield—Jun. 9, 1985.

Evolution of Integrated Digital Network and Service Integration—09/79 pp. 1.1.4/1–6.

Electronic Switching Systems—Fujitscu Sci Tech J. 21.3—pp. 225–258—Jul. 1985.

NETMASTER Functional Specification Number: Fax 002 Version: 2.00—Oct. 16, 1984 pp. 1–123.

26 FaxMaster 21 Remote Operation—FaxMaster 21 User Handbook—Sep. 17, 1986.

NEAX 2400 IMS NEC Facsimile Mail Module General Description—1986.

NEAX 2400 IMS FMM (Facsimile Mail Module) System Description—01/86—NEC Corp.

Kobayashi and Kamae, "A new Nation–Wide Network for Public Facsimile Communication" JTR, vol. 20, No. 4, pp. 276–281, 1978.

Kamae, Endo and Nakabayashi, "Facsimile Intelligent Communication System FICS–1" Review of the Electrical Communication Laboratories—vol. 29, No. 7–8, p. 649–662, 1981.

Ejiri, "Advanced Facsimile Communication Network", JTR, vol. 25, No. 3, 1983.

Fax Management System Description—Jul. 1991–Release 1.5.

Network Architecture of Advanced Facsimile Intelligent Communication System—pp. 37–51 Watanabe et al.—1981.

Electrical Communications Laboratories Technical Journal, vol. 34, No. 10, Published Oct. 22, 1985—Enhanced Facsimile Intelligent Communication System (FICS–21) w/translation.

Electrical Communications Laboratories Technical Journal vol. 33, No. 7, Published Jul. 22, 1984 pp. 3 to 5, and 9 to 11—w/translation.

Complaint and Demand for Jury Trial—Audiofax IP, LLC vs. Jfax.Com, Inc.

Answer and Counterclaim—Audiofax IP, LLC vs. Jfax.Com, Inc.

CCITT—Red Book—Data Communication Networks Message Handling Systems—Recommendations X.400–X.430—vol. VIII—Fascicle VIII.7—1984–1985.

Sprint Corporation and Sprint Communications Company L.P.'s Answer to First Amended Complaint Counterclaim and Demand for Jury Trial (including allegation of inequitable Conduct).

Complaint and Demand for Jury Trial—Audiofax IP, LLC vs. Concord Technologies, Inc.

Concord Technologies, Inc.'s Answer to Compaint, Affirmative Defenses and Counterclaim (including allegation of inequitable conduct).

Allegation of Inequitable Conduct—Sprint Corporation & Sprint Communications Company L.P., Answer, pp. 1–3, Dec. 13, 1999.

Request for Re–Examination—Arguments of Requestor W.T. Babbitt, dated Oct. 19, 1999 pp. 1–10.

Complaint and Demand for Jury Trial and First Amended Complain & Demand for Jury Trial Audiofax IP, LLC vs. Sprint Corp. et al.

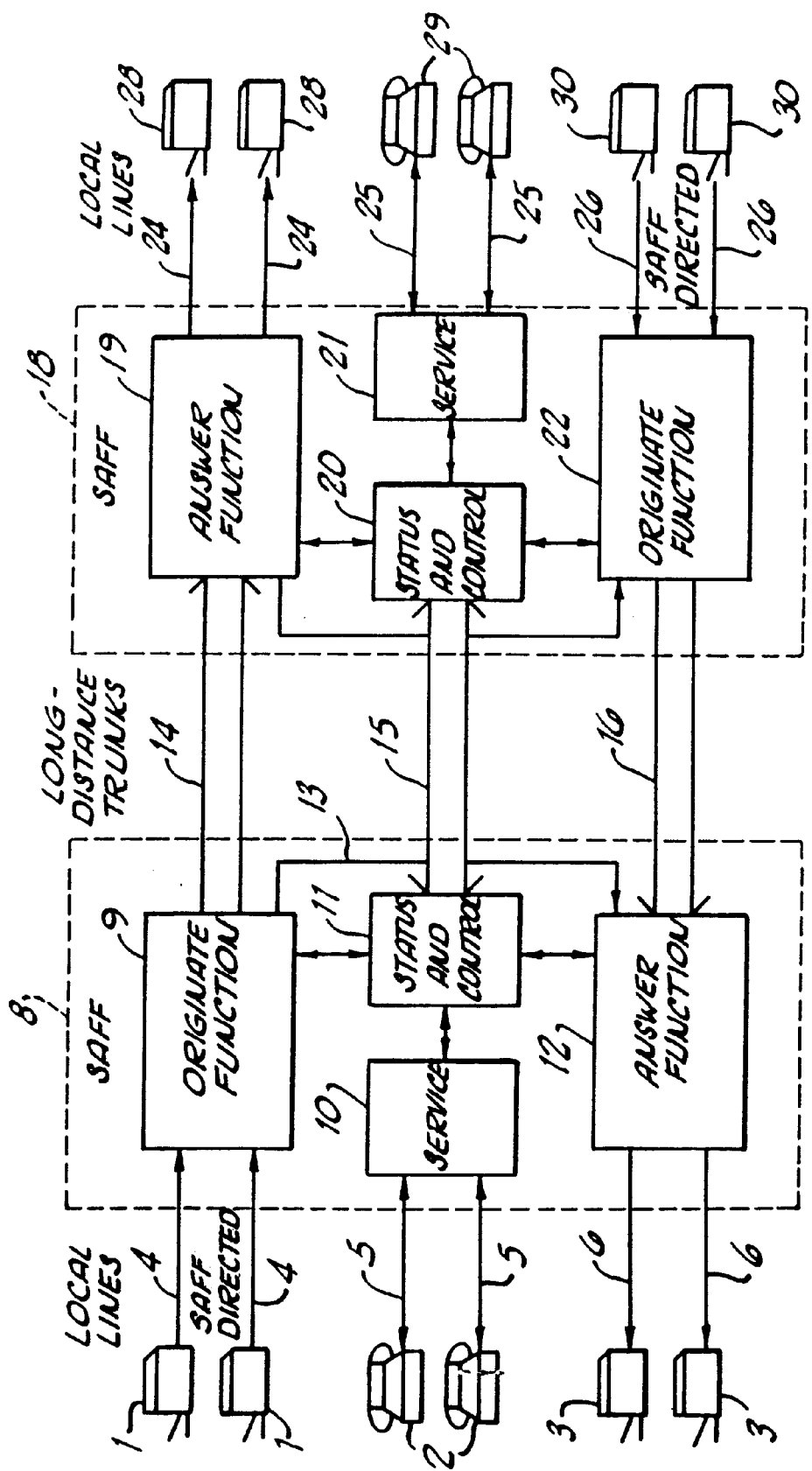

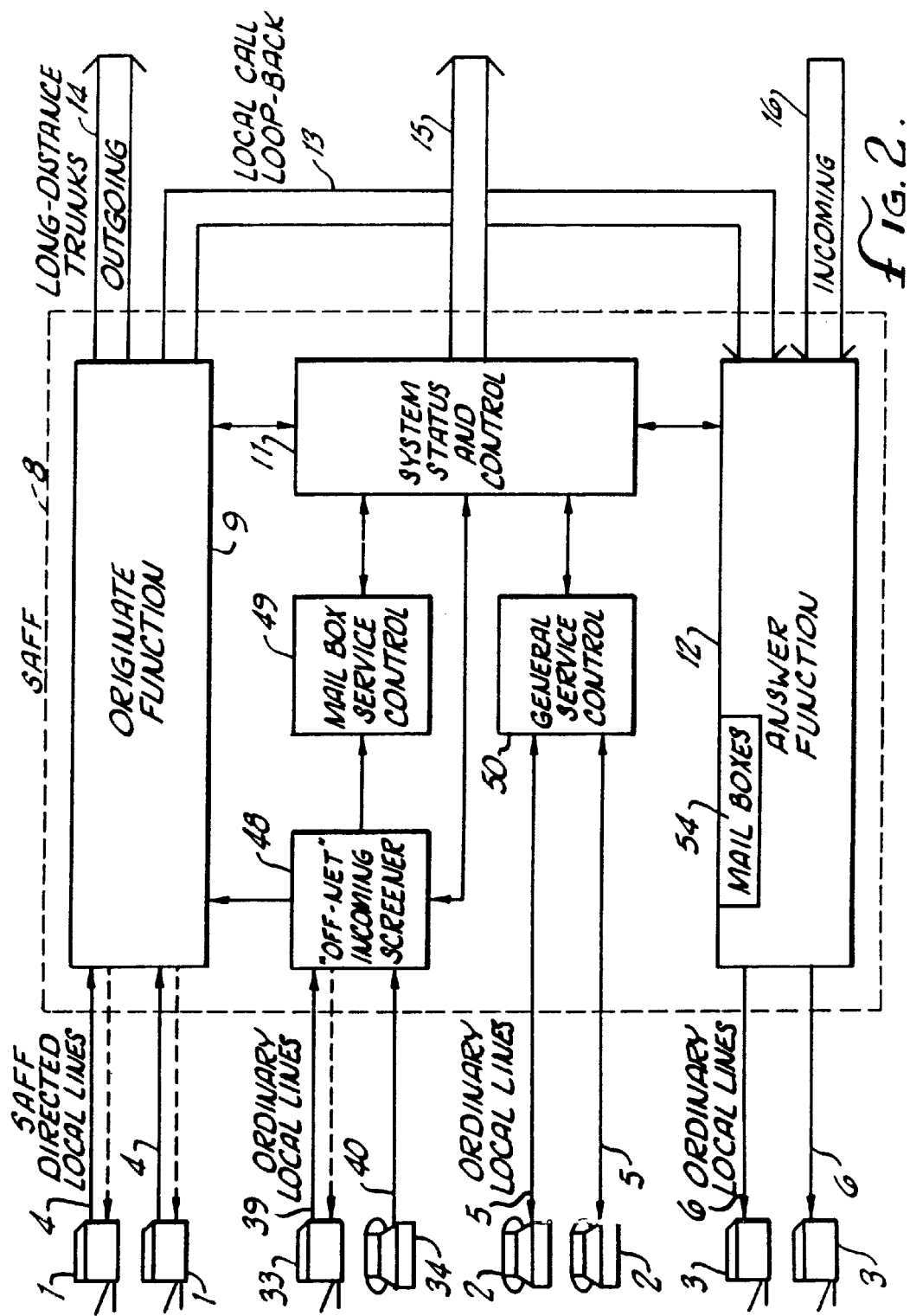

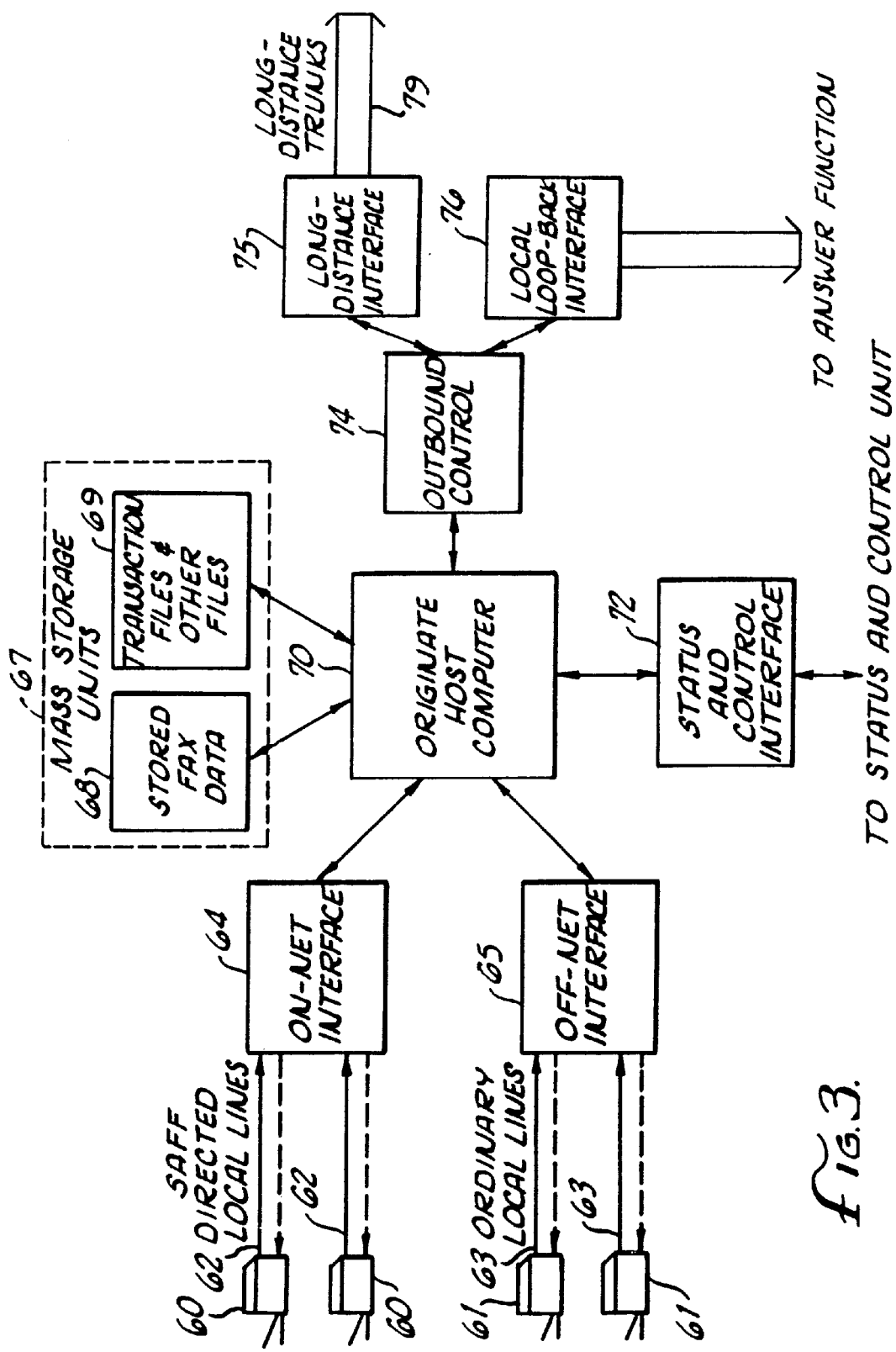

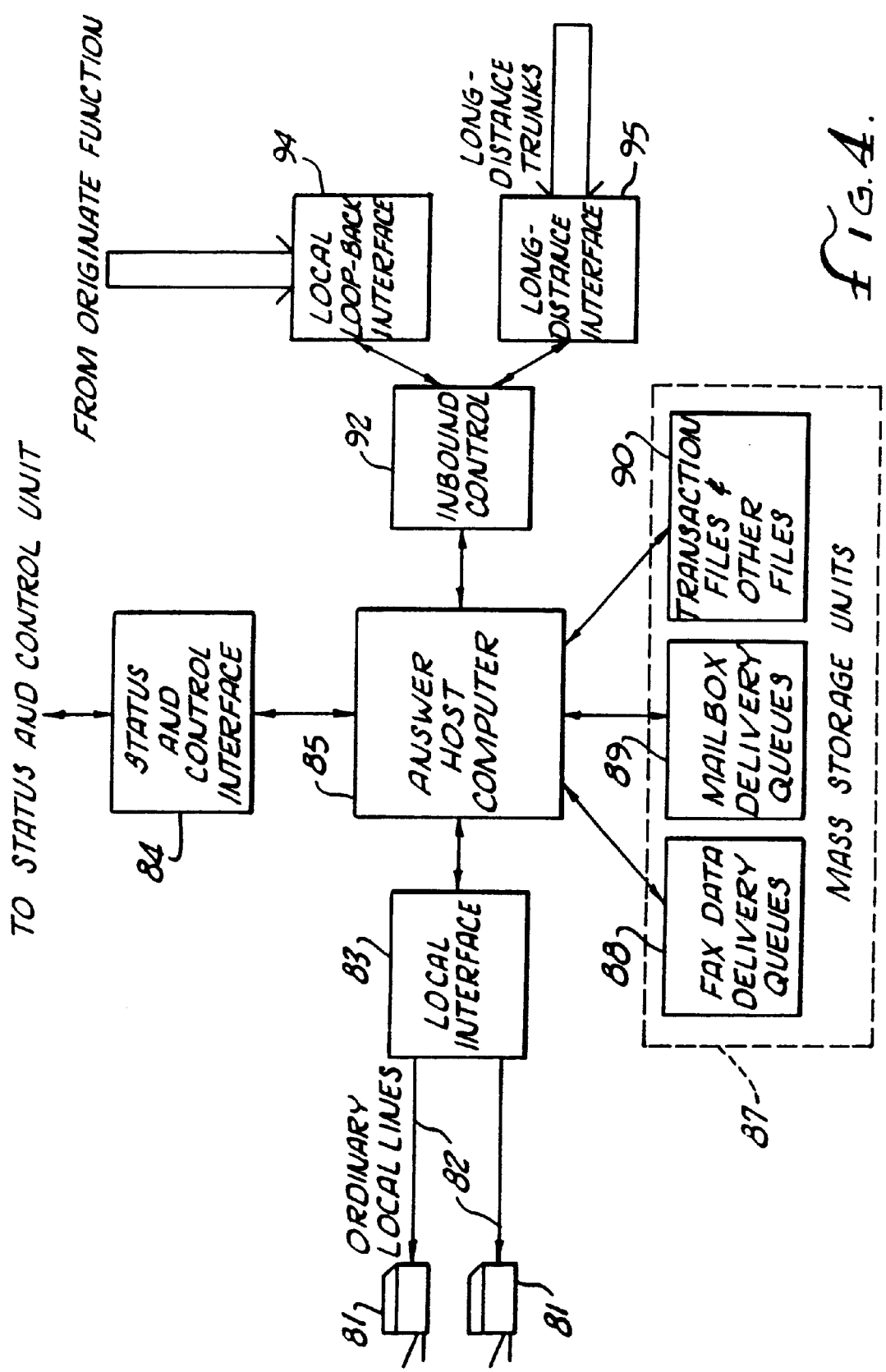

FACSIMILE TELECOMMUNICATIONS SYSTEM AND METHOD

CROSS REFERENCE TO RELATED APPLICATION

This application is a continuation of application Ser. No. 08/780,690, filed on Jan. 8, 1997, which is a continuation of application Ser. No. 08/395,062, filed on Feb. 27, 1995, now abandoned which is a continuation of application Ser. No. 08/371,842, filed on Jan. 12, 1995, now U.S. Pat. No. 5,459,584, which is a continuation of application Ser. No. 07/955,833, filed on Oct. 2, 1992, now U.S. Pat. No. 5,291,302, which is a continuation of application Ser. No. 07/654,181, filed on Feb. 12, 1991, now abandoned, which is a continuation-in-part of application Ser. No. 07/248,798, filed on Sep. 22, 1988, now U.S. Pat. No. 4,994,926.

This is a continuation-in-part of application Ser. No. 07/248,798 on Sep. 22, 1988, in the name of Richard J. Gordon and James R. Kennedy and assigned to F-Mail Associates, L.P.

FIELD OF THE INVENTION

The field of this invention is telecommunications systems used in connection with facsimile transmissions. More specifically, this invention relates to a system and method for enhancing ease of facsimile transmissions and providing features relative to facsimile transmissions not heretofore available.

BACKGROUND OF THE INVENTION

The electronic transmission of documents by way of facsimile (fax) systems employing public and private switched telephone networks has become both commonplace and, often, an essential component in many business activities. In such a setting, it is very common for the fax terminals (fax machines) to be kept quite busy during a major fraction of the business day. Moreover, where sender and recipient are in different time zones, the "business day" can approach 24 hours, particularly in international activities. It is common for fax users to "broadcast" documents to a number of different recipients, that is, send the same message to several different fax machines. It is also true that the contents of some faxed documents are of such a sensitive nature that the originator or addressee would like to have a measure of control over who might see those documents as they move from the receiving machine to the hands of the actual addressee.

These circumstances present a number of practical problems for a fax user. In order to make a successful fax transmission it is necessary that the receiving machine be available at the time that the transmitting machine attempts to contact it. If the receiving machine is already in use handling another message, the transmitter will receive a "busy" signal. The originator's only recourse is to continue initiating telephone calls until contact can be established. This is a "hit or miss" process at best and can be very wasteful of the originating operator's time.

Some, rather expensive, fax machines have digital memories which will allow them to memorize the document to be transmitted and to be programmed to make multiple redials in an effort to establish contact in an automatic way. However, this is limited to only one or two documents and, more importantly, it ties up the transmitting machine until the effort is successful or abandoned. This is hardly an acceptable solution if that machine has other documents to send or receive.

There are other conditions which can result in a failure to transmit even though a telephone connection has been established. Perhaps the most common of these is the absence of paper in the receiving machine. In such situations, repeated attempts to "redial" will lead to repeated toll charges with each attempt, with no actual success until the receiving machine is serviced (which may be some time if the machine is operating unattended because it is night-time half-way around the world).

Busy machines which are destined to receive messages are affected by the converse problem. Since they and the prospective transmitting machines must engage in (perhaps, automated) "telephone tag", they are used very inefficiently. When a transmitting machine gets a busy signal, even if it automatically redials, it can only guess at when the receiving machine will be available. Thus, the receiving machine will likely remain idle for some fraction of the time until such an attempt is made.

The practice of broadcasting documents to a number of addressees obviously compounds these problems and adds still others of its own. Even if one does not encounter busy signals or impaired machines, convenient broadcasting demands an expensive memory-type fax machine on the transmitting end. Such machines read in the document once and then proceed to automatically dial the various recipient machines. This process ties up the sending machine and its telephone line and makes them unavailable for incoming calls. This, of course, exacerbates the busy signal problem for those units trying to contact the sending machine.

The security of sensitive documents is still another problem. Once contact is established between two fax machines, the transmission of the document proceeds automatically, irrespective of who may be standing by the receiving machine at the time. In a busy office, the contents of these documents are accessible to the fax operator and anyone else who happens to be in the vicinity.

It is also common for individuals to wish to deliver fax documents to a recipient who is not currently available through a known machine (e.g. a person on a business trip). This is a very inconvenient situation in that it requires that the paper documents be held until the traveler phones in from a remote machine. It further requires that there be someone available at that time who has knowledge of and access to the documents intended for the recipient.

Another concern is related to so-called paperless fax terminals. In recent years, paperless fax techniques allow a computer or a micro-processor equipped with specific software and modem to directly transmit and receive facsimile messages. However, it is also very common that the recipient is not in his or her office (the paperless fax terminal may also be located at home) at the time when fax message is coming. For example, the recipient is out to lunch or otherwise absent from his or her office or home. This requires the sender to retry the communication message delivery again and again if there is no other fax machine available in the office.

Still another concern is adequate accounting control over the billing of calls. Typically, many businesses wish to be able to track the costs of both fax machine use and the associated telephone charges. While telephone charges can be ascertained from telephone company records, in the present environment these must be related to records of the number of pages transmitted per call and so forth, separately maintained by the fax machine or its attendants.

SUMMARY OF THE INVENTION

The objects of this invention are to address these many shortcomings of present fax systems and to provide an integrated system for their solution. Furthermore, the intention is to achieve this in a way which is fundamentally compatible with existing fax terminal machines. The basic approach is to provide special computer-based fax Store And Forward Facilities (SAFF's) as an integral part of a switched telephone network system. All fax transmissions entered into the network are routed to such a facility, typically geographically near the originating machine, where they are temporarily stored or "spooled" by the computer in a mass storage buffer, such as a magnetic disk.

The fax message from the originating machine is intended for a destination machine, which may or may not be in a position to immediately answer the call. If the destination machine is within the service region of that SAFF, the system then proceeds to attempt to call the destination fax machine. If the destination machine is within the service area of a different SAFF, the system forwards the fax document data to that facility by long-distance lines, in which case this second facility attempts to call the destination machine. In either case, if contact is established and the message is delivered immediately, the system directs a printed report back to the originating fax machine confirming delivery to the destination machine, and other pertinent data.

If, on the other hand, the delivery cannot be completed immediately due to a busy signal, a machine fault (eg, receiving machine out of paper) or any other reason, the spooled document is saved and the system makes periodic attempts to contact the destination machine and complete the transmission.

In the meantime, the system sends a printed report back to the originating machine acknowledging that the message has been entered into the system, indicating the reason the delivery is being delayed, stating the protocol the system will take to deliver the message, and providing a reference number or "Message Code" which identifies the message and may be used at a later time to trace the status of the document.

Placing the delivering spooling system geographically near the destination machine has the advantage of more economical use of any long-distance lines that may be involved. These lines are used only to move the message from the originator to the spooling system in the vicinity of the destination, which is virtually certain to be successful on the first try. Subsequent attempts to contact the destination machine can be handled more or less locally and need not tie up the bulk of the long-distance facilities.

If the delayed delivery is ultimately successful, the system will send a printed delivery report to the originating machine. On the other hand, if the delivery attempt protocol has gone through its whole cycle without success, a report will be sent to the originator indicating that the delivery procedure has failed and requesting instructions as to how to proceed (eg. try again, redirect the message to an alternate number, or delete the message).

An important feature of the system is that it recognizes all of the documents that are spooled in the system at a given time for a given destination machine. These are identified and linked together to form a message queue for that machine. In this way, once contact is established, all of the waiting messages can be "dumped" to that machine in a continuous batch. Furthermore, if new messages arrive while that dump is occurring, they are simply appended to the end of the active queue and are transmitted when their turn comes. This has the advantage of greatly enhancing the utilization efficiency of a busy destination machine.

Since all outgoing fax documents are temporarily stored at the facility near the originating machine, it is also practical to provide for automatic broadcasting of documents to multiple destinations. Lists of "broadcast groups" of phone numbers can be programmed into the facility by users, or a list of destination phone numbers entered "by hand" at the time of a call. The SAFF can then broadcast the message to every machine of the selected list. This is a great advantage to broadcast users in that they need only tie up their machines for one outgoing transmission, the one to the SAFF. The SAFF copies the message to all of the destination machines as outlined above. In the meantime, the originating machine is available for receiving or transmitting other documents.

Similarly, since the documents are stored near the originator, the system can permit messages which have already been sent to be copied to other destinations after the fact, without the necessity of resending the message to the SAFF. Likewise, since the messages are also spooled in a facility near the destination, the system also provides the recipient with the option of forwarding or redirecting documents to still other destinations, as if the recipient were the originator. The system can also accept and store messages destined for a fictitious destination or "Mail Box". Thus, individuals who are traveling can, at their convenience, dial into the system and pick up any waiting documents.

Other services are provided that are particularly useful to individuals who are not at the "home" machines. For example, so-called "paperless" fax terminals, small portable computers equipped with modems and software programs which enable them to emulate fax terminals, are being employed at an increasing rate. The Mail Box system recognizes a variety of these devices and provides interactive features to facilitate their use. In this case, the SAFF can either periodically retry to communicate with the intended paperless fax terminal or transmit the fax message to another paperless fax terminal or fax machine as instructed by the recipient or sender. In addition, the system recognizes a small, highly portable Mail Box Reader that consists of an adapter that can be connected between the user's telephone and a normal television set (for example, in a hotel room), allowing the user to display fax messages received from the Mail Box on the TV screen.

The system is also programmed to provide a fax-to-voice message conversion service which can convert an inbound fax message into a voice mail message and send the message to the intended recipient's voice mail box, such as an answer machine.

Another useful feature is the ability of a fax recipient to send automated-voice replies to fax messages back to the originators (typically directed to a voice mail box). This permits the recipient to select a, generally terse, response from a menu of possible replies. These replies may be selected from a menu of standardized responses provided by the system or from a menu of customized responses, in the user's own voice, that is maintained by the system.

Closely akin to these features is the ability to have the originator of a transmission include the requirement that the recipient provide a security code, such as a PIN number, in order to release the document from the spool to the destination machine. In this case, the SAFF sends a written report to the destination machine advising that a secure message is waiting for a particular recipient and the fax identification of the originating machine. The recipient must then call in to the SAFF and key in the security code to initiate the delivery of the document. Since the document is spooled, the delivery easily may be delayed until the recipient is available to supply the code.

Finally, since the documents and their delivery are both under the control of the telephone system, as a special service the telephone call accounting system can provide both time and charges for the telephone services rendered and fax information, such as pages transmitted, sorted according to the originator's clients. This can greatly facilitate the fax user who wishes to do cost accounting or to bill clients for costs incurred.

BRIEF DESCRIPTION OF THE DRAWINGS

Other objects and advantages of the present invention will be apparent from the following Detailed Description of the preferred embodiments thereof and from the attached Drawings of which:

FIG. 1 illustrates the inter-relationships of the principal elements of a connection between two SAFFs.

FIG. 2 shows a more detailed view of the various systems within a single SAFF, such as those shown in FIG. 1.

FIG. 3 illustrates the major components of the Originate Function in the SAFFs shown in FIGS. 1 and 2.

FIG. 4 illustrates the major components of the Answer Function in the SAFFs shown in FIGS. 1 and 2.

DETAILED DESCRIPTION

Introduction

Figure 5A:
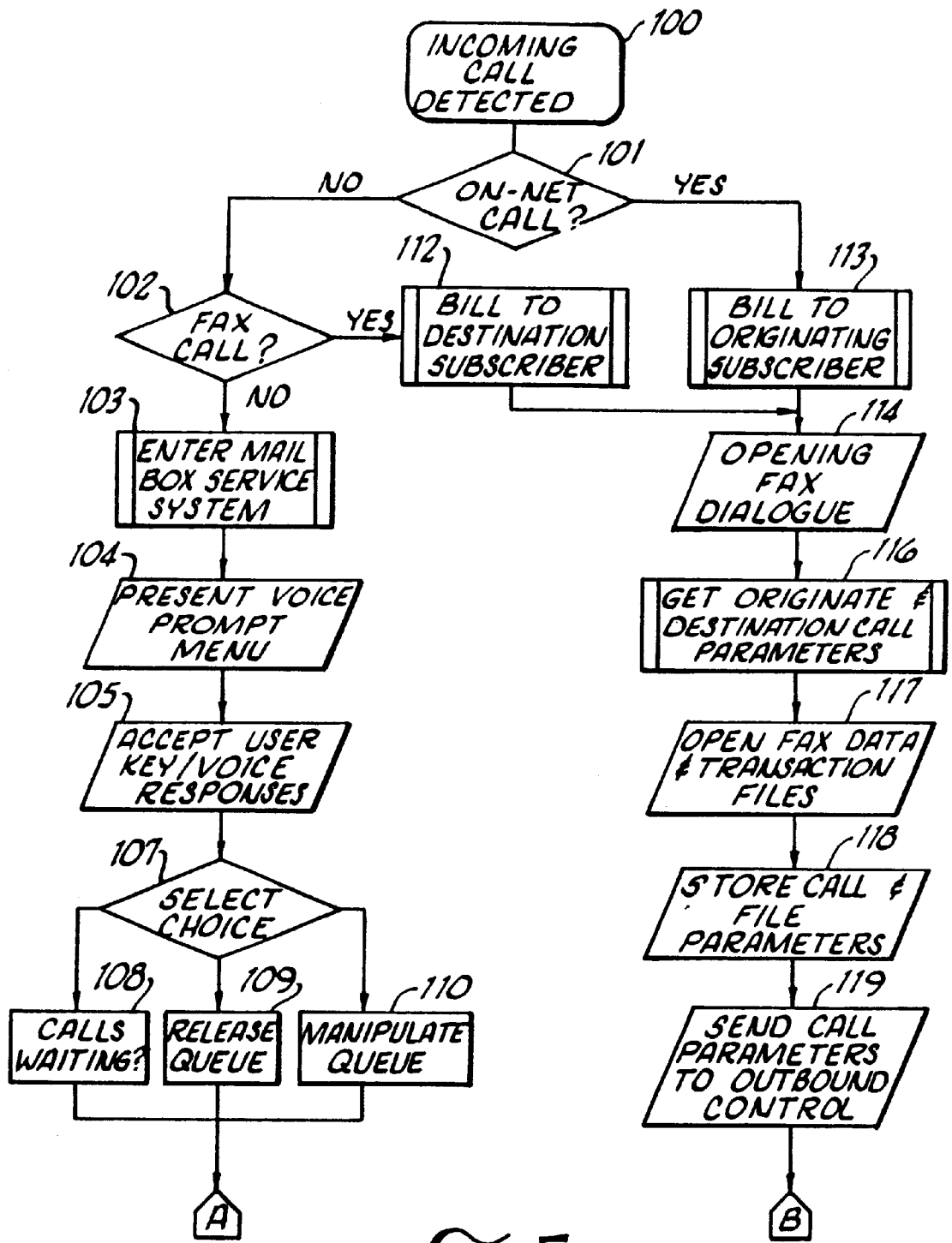
FIGS. 5a and b show a flow chart describing the general processing steps required to handle a fax or voice message incoming to the Originate Function of a SAFF, as described particularly in FIGS. 2 and 3.

The preferred embodiment of this invention is a multifunction, interactive facsimile transmission system which is integrated into a switched telephone distribution network, where "network" is taken broadly to mean the entire system required to complete a communication from an originator to an answerer. This embodiment provides a comprehensive computerized fax message management system based on automated fax Store And Forward Facilities (SAFF) embedded in the network. This system requires no modifications to existing facsimile machines, but rather, relies on the network to provide the enhanced services.

The system contains several components which actually transmit the fax messages and related information, provide written fax reports to users about the status of messages within the system, allow user intervention in the sequence of automatic actions of the system, provide an accounting of services rendered for both the customer and the telephone company, and control and supervise all of these activities.

In the preferred embodiment, it is presumed that the SAFF's are placed at the interface between the local telephone delivery system and the long-distance delivery system, as indicated in FIGS. 1 and 2. In this setting, the SAFF system can be controlled and its services offered by either one. However, it is obvious that useful systems can be constructed where the SAFF exists as close to the user as a component of his or her own in-house telephone system (such as a PBX or Centrex) or as remotely as a single, independent, stand-alone SAFF serving a wide geographical area. It is also obvious that commercially viable systems can be constructed which provide subsets of the features of the preferred embodiment. The choice of site/control setting and service features might be driven by any number of economic, market, or legal considerations, which would militate toward offering the system at an alternate location in the network, or in a "stripped down" form.

To more clearly understand the present invention, it is useful to consider the manner in which a fax transmission occurs in the traditional setting. Here the communication between two machines is initiated when the destination machine answers a telephone call directly from the originating machine. Typically, there is an exchange of digital data identifying the sending and receiving machines to each other and establishing the fax mode or format to be used. If this exchange is satisfactory, then the actual image transmission takes place. Otherwise, the call is terminated, usually with some form of written diagnostic to the respective users.

Message Interception

In the present invention, all fax transmissions initiated by a subscriber to the fax management system are first intercepted by an "originator" SAFF; that is, the SAFF which directly services the originating fax machine. FIG. 1 shows two exemplary SAFFs 8 and 18, with interconnections between the SAFFs and with subscriber fax machines being diagrammatically indicated. Thus in FIG. 1, the SAFF 8 includes an originate function 9 coupled over telephone lines 4 to originating fax machines 1. Likewise, the SAFF 18 includes an originate function 22 coupled over telephone lines 26 to originating fax machines 30. Each of the SAFFs 8 and 18 also includes respective answer function blocks 12 and 19 respectively connected over telephone lines 6, 24 to fax machines 3, 28. Each of the SAFFs 8, 18 also includes service interfaces 10, 21 coupled via telephone lines 5, 25 to telephones 2, 29. The function and purpose of the service interfaces is more fully explained hereafter, and they are under control of status and control blocks 11 and 21.

Access to the system of FIG. 1 can be obtained much the same as access to a specific long-distance company's network. That is, subscribers such as 1 in FIG. 1 can dial a unique access code at the time a call is initiated, or a telephone line dedicated to a fax terminal may be permanently routed to the SAFF system, in this case the SAFF 8 of FIG. 1. Either way, one accesses SAFF Directed Lines 4 and the SAFF 8 itself in the process of dialing the destination fax machine.

The SAFF 8 then answers the phone in place of the destination machine, such as one of 28 shown in FIG. 1 as serviced by SAFF 18. For the moment, this SAFF 8 near the originator becomes the proxy for the destination machine 28. While noting the actual destination telephone number, the SAFF 8 engages the originating machine in the same digital dialogue that would have occurred if a direct connection to the destination machine had actually been made. Thus, it echoes back the destination telephone number, to identify the intended destination machine, and agrees to accept the fax format requested by the originating machine.

This causes the originating machine 1 to respond by transmitting the fax document image data. The originating machine's identification, the destination machine's telephone number, the fax format, and the document image data are all stored on a mass storage device 67 (in FIG. 3), such as a computer magnetic disk unit. Furthermore, a unique alphameric Message Code is assigned to the block of data to identify it while it is resident in the SAFF system. This Message Code is related to the file name for the stored data.

Delivery

At this point, the SAFF 8 initiates two actions. The first is to generate an "Acceptance Record" of the transaction to this point. This record, in one form or another, will be returned to the originator as will be described below. The second step is to begin to deliver the fax message to the destination machine 28.

The details of the delivery process depend to some degree on the geographic location of the destination within the network. A single SAFF can, in principle, service a broad geographical area. However, in the preferred embodiment, communications beyond a certain limiting distance involve at least two SAFFs, one 8 near the originator 1 and the other, a "destination SAFF", 18 near the recipient 28 of the document. The choice of one, two, or more SAFFs is determined by network economics, or other considerations, and is not essential to the invention.

For the sake of this discussion, we will define a "local" message to imply that the originating and the destination machines are serviced by the same SAFF. (Although, this does not preclude the possibility that the two machines are some considerable distance apart and connected by a toll call.) On the other hand, we will define a "long-distance" message to mean that the originating and destination fax machines are serviced by different SAFFs and, thus, one SAFF must exchange data with the other, perhaps through intermediaries. Similarly, the term "near" used in connection with a SAFF refers to being within the service area of that SAFF.

Each SAFF 8, 18 has two clearly defined roles: the "Originate Function" 9, 22 for handling data with an originating machine, and the "Answer Function" 19, 12 for handling data with a destination machine. The details of these two subsystems are illustrated in FIGS. 3 and 4 respectively. In the local message mode, the connection between the Originate Function, such as 9, and the Answer Function, such as 12, is linked within the single SAFF 8 by way of a Local Call Loop-back connection 13, between the two Functions. In the long-distance mode, the Originate Function 9 of SAFF 8, near the originator, is linked to the Answer Function 19 of another SAFF 18, near the destination, by long-distance lines, such as 14, or 16 for SAFF 18. Thus, processing a long-distance message involves the same basic steps as a local message, except that the activity is shared interactively between at least two different SAFFs.

Originate Function

With this understanding of SAFF functions, the following detailed discussion will illustrate the operation of the system in the long-distance case, since it is the more complex, and therefore provides a more comprehensive example. FIGS. 1, 2, 3, and 4 all show elements of the SAFF system in varying degrees of detail and all will be referred to in the following. It will be noted that some critical elements are shown in more than one of the Figures.

As an example, it is assumed that one of the subscribers 1 attached to SAFF 8 wishes to send a fax message to one of the subscribers 28 attached to SAFF 18. The subscriber 1 places the call to the destination machine 28 which is routed over SAFF Directed Lines 4 to the Originate Function 9 of SAFF 8. These signals originate within the SAFF system and they are picked up by the On-net Interface 64 which is part of the Originate Function, as shown in FIG. 3. This Interface signals the Originate Host Computer 70 of the incoming call and the Host responds by directing the incoming data to a Mass Storage Unit 67 where it is stored in a file 68.

During this storage process, the Host directs two other activities. It creates a call status record file 69 (FIG. 3) in mass storage, recording the time and date of the origination, the telephone number of the calling machine, the telephone number of the destination machine, any security or other special services requested, various housekeeping information, and it assigns the Message Code number which locates not only the status file but also the fax data file associated with it. The Host also passes the destination machine's telephone number to the Outbound Control unit 74 which proceeds to connect the originating SAFF 8 with the nearest available SAFF 18 to the destination through a long-distance interface 75 over long-distance circuits 79 (14 in FIG. 1). In the process of establishing this connection, the Outbound Control unit employs an algorithm which examines the number and kind of available trunk resources and chooses the most efficient combination of these lines for the task required.

Answer Function

The originating SAFF 8 then proceeds to transmit the originator and destination telephone numbers, the stored fax image, the Message Code, and other housekeeping data to the destination SAFF 18. These data are sent by the most expedient mechanism offered by the long-distance service. For example, if this service employs digital communications, the fax data may well be transmitted at a significantly higher rate than it was originally received into the system.

The fax data is received by the Long-distance Interface 95 (FIG. 4) in the Answer Function 19 of the destination SAFF. This unit signals the Answer Host Computer 85 of the incoming data. The Host then routes these data to its Mass Storage facility 87. (It should be noted for later reference that the originator SAFF and the destination SAFF now both have a copy of these data.) The Host notes whether other messages are pending for the destination machine and either opens a Delivery Queue file 88, or appends the new message to the existing Queue File.

The Host also records the arrival time and other pertinent information about the fax message in a Call Status file 90 in Mass Storage unit 87, and sends a status update back to the originating SAFF 8 by way of the Status and Control Interface 84, and the System Status and Control Unit 11 via Long-distance Trunks 15.

It then signals the Local Interface 83 to dial the destination machine's (81 in FIG. 4) telephone number on ordinary outgoing local lines 24, 82. If the destination fax's line is available, the destination SAFF now becomes the proxy for the originating fax machine and engages the destination machine in the necessary preliminary digital dialogue.

If this is successful, the document image, including the source and destination identification information, the Message Code, and the entry and delivery times, is played back from storage and delivered to the destination. A "Delivery Record" is then created by the Answer Host 85 which indicates the date and time of delivery, and any other pertinent data. The Delivery Record is sent back to the originating SAFF 8, again by way of the Status and Control Interface 84, and the System Status and Control Unit 11, via Long-distance Trunks 15. The originator SAFF 8 then appends this information to the Acceptance Record to form a complete "Transaction File". The originating SAFF 8 then sends this file, as a delivery receipt or report, back to the originating machine 1, 60, as a fax document.

If the destination machine's line is busy, or the contact fails for some other reason, the destination SAFF's Host Computer 85 will enter a sequence whereby it will attempt to contact the destination machine and transmit the document on a predetermined schedule for a specific period of time or number of tries. As this sequence is entered, a "Retry Record" is generated documenting the situation and the system's response to it. This record contains the reason that the delivery was delayed and it indicates which protocol the system will use to attempt to deliver the message. This is transmitted back to the originating SAFF 8, as described above, and appended to the previously described Acceptance Record to form a Transaction File which is then sent as a fax message back to the originator. The assigned Message Code is a part of every transaction report and may be used at any time to trace the status of undelivered documents, as will be described shortly.

If the retry effort is ultimately successful, a Delivery Record is appended to the Transaction File which is sent back to the originating machine. If the effort fails after reaching the predetermined limit, this is also recorded, appended, and sent back to the originator. In this case, the originator is given the option of dialing back into the system within a certain length of time (typically several hours) and instructing the destination SAFF as to how to dispose of the document (eg. repeat retry sequence, forward to a different telephone number, or delete the message).

This process is handled by using an ordinary touchtone phone to dial a multipurpose (perhaps, toll free) fax system "Service Number"; which will be referred to here and in later sections. This might be a unique number for every SAFF, or it might be a standardized number common to many localities, except perhaps for area code, such as is 555-1212 for calling "Information". This Service Number is answered by the General Service Control units (10 in FIG. 1, 50 in FIG. 2) of the SAFF to which the call is directed. This unit contains an automated voice response system that presents a menu of the available services and prompts the user to select the desired choices by pressing particular numbers on the touchtone keypad. In an advanced embodiment, a computer-based voice recognition system replaces the keypad and accepts verbal commands in a conversational way.

The General Service Control unit 50 can communicate with its own System Status and Control unit 11, and through that unit, any other such unit 11, 20 via Long-distance Trunks 15. Through these connections, both inquiries relating to messages in the system and instructions as to their disposition may be addressed to the entire SAFF system.

Having selected the "failed-connection message disposition" choice, the user is prompted to key in the Message Code. The system verbally repeats the code and the delivery discrepancy for verification, and then presents a menu of disposition options for the user to select with the keypad.

If the user does not take advantage of this "what to do now" opportunity within the time limit, the message is retransmitted back to the originator with a report. It is then erased from both the originator and destination SAFF files after a suitable delay (typically six hours). If the originator wishes to resend the message during this "grace" period, it may be recovered and resent to the original destination or forwarded to another destination(s), as will be described later.

In each of the various cases where the SAFFs automatically direct fax message status reports (such as, the Acceptance, Delivery, or Retry records above), the system can be programmed to accumulate records from all calls over a period of time (eg. an hour) at the originator SAFF and deliver them as a single fax document at the end of the period or upon request by the originator. This has the advantage of reducing the number of report calls and the subsequent burden on the originating fax machine. The originator SAFF will enter a retry sequence if it finds the originator's line busy or the machine unavailable when it attempts to deliver reports. This is a persistent sequence which it will continue trying for direct contact at intervals of an hour or so for a considerable length of time (eg. 72 hours). It also places a copy of the report in the originator's Mail Box (described below) so that the originator may recover it in between SAFF delivery attempts.

It should also be noted that the originator has the option of dialing the Service Number at any time and inquiring about the status of a given message. Here again, the voice response system prompts, presents menus, and uses the Message Code to locate and report on the current location and condition of the message. A written record can be directed to the originating or destination fax machine, if desired.

Another feature of the General Service function (and the Mail Box function described later) is the ability to send an immediate reply to a received fax message. There are many instances where one might wish to provide a personal acknowledgement of receipt and some indication of the future course of action. A collection of such responses is available and may be selected from a menu using the General Service or Mail Box systems. Examples might be: "I received your fax number (Message Code) at (date, time)"; "I am unable to respond at this time"; "I will respond in the next 24 (48, 72) hours"; "I completely agree, proceed as described", "Take no action until you hear from me", and so forth.

In a typical transaction, the system asks the user for the SAFF-assigned Message Code and then presents a menu of these "canned" responses. It will also permit the concatenation of several such responses to form a more complex message. Once the user has made the appropriate selections, the system will replay an automated voice version of the message and permit editing as required. When the user is satisfied, the reply is then transmitted either as a fax message or as an automated voice message to a designated telephone number. That number may represent an active fax or voice number, or it might represent a fax or voice mail box.

When a voice reply is selected, the user can select the sex of the automated voice, or the user can actually employ a personalized menu of custom responses tailored by the user to his or her own requirements and prepared in the user's own voice.

Still another feature of the General Service function is the ability to provide a fax-to-voice message conversion service. This service allows the SAFF system to receive an inbound fax message and then electronicaly create a voice mail message directed to the intended recipient voice mail box as instructed by the message sender or the intended recipient. The fax message may be stored in a subscriber's mail box in the system which will be fully discussed later. In order to provide this service, the SAFF is equipped with suitable software and voice print database that will permit the system to electronically interpret the facsimile message from printed documents to verbal text. The voice mail message transferred to the instructed voice mailbox may be the whole text of the facsimile message or only a voice message which will verbally identify the originator of the facsimile message, the reading time and the number of papers. The intended recipient can then commence the electronic translation by touch-tone signal and can control the operation in fast forward or reverse through the document by touch-tone command.

Another feature of the system is that the act of accepting and storing an incoming message at the originator SAFF, and the act of dialing and forwarding that message to the destination by the destination SAFF, can overlap in time. That is, if the originator SAFF has lines available, once the initial connection dialogue between the originator and the SAFF is complete, the SAFF may immediately make its first attempt to contact the destination SAFF and, thus, the destination machine, while it is beginning to spool the document.

If this immediate contact is successful, then the message is passed from the originator SAFF 8 to the destination SAFF 18 to the destination machine 28 directly from the Originate Host Computer's memory 70 while the two SAFFs are still in the process of spooling the document to disk. This is facilitated by a "write-through pipeline" whereby the Originate Host 70 passes the incoming fax data through directly to the Outbound Control unit 74 at the same time it is being written to mass storage. It is held in a temporary memory buffer in the Outbound unit until it is clear whether or not an immediate connection to the destination machine is possible. At that point the temporary buffer fax data is either sent and then deleted, or merely deleted. The net effect is that the spooling process only adds a few seconds delay in the message delivery over the traditional direct machine-to-machine contact when the destination machine is readily available.

On the other hand, if lines are limited, the originating SAFF can choose to delay until suitable lines are available. This has the advantage of improving communications resource management and enhancing the efficiency of the telephone system's line usage over the direct contact scheme.

The foregoing describes the basic fax SAFF message handling system and from this discussion several advantages should be apparent. The originating machine always functions as if it makes contact and delivers documents on the first try, thus immediately freeing the machine and the attendant personnel for sending or receiving other transmissions. Likewise, the telephone system only handles one call across its local and long-distance lines from the originating machine to the destination SAFF, since the state of the destination machine has no impact on the call. This significantly improves the efficiency of line usage when messages are addressed to busy fax terminals.

Although some additional calls are needed to deliver the various reports, these require very little long-distance time, as they are transmitted over the circuits as highly compressed coded messages. It is the nearby originating SAFF that translates them into "plain language" for fax delivery as a local message. As pointed out, additional savings in these local messages can be gained by compiling multiple reports and delivering them in bulk as a single call. It should be noted that the delivery of reports to an originator is a cooperative process between the Originate Function and the Answer Function of the originate SAFF. The Originate Function 9 actually generates these reports and passes them through the Local Call Loop-back 13 (76 in FIG. 3) to the Answer Function 12 for delivery as an ordinary fax message.

In addition to these basic features, the design of the system also provides for a number of additional services and advantages which are described below.

Message Queuing

As pointed out, all fax messages directed to a particular telephone number are spooled by the Answer Function of the destination SAFF, as detailed in FIG. 4. The Host Computer 85 controlling this function monitors the incoming messages and links all undelivered messages for a given telephone number into a message Delivery Queue file 88. The computer also compiles a constantly updated, ordered catalog of the file names of the messages waiting for each fax machine.

Consequently, when messages arrive at a rate faster than they can be delivered, for whatever reason, they are held in this queue for delivery. As soon as the destination SAFF establishes contact with the destination machine, it begins sending the entire queue of messages in a single, essentially uninterrupted transmission. Messages that arrive while the transmission is in progress are appended to the end of the queue.

This scheme eliminates the "trial and error" dial and redial attempts that result from a number of independent incoming calls competing in an uncoordinated way for the single destination line. It can significantly enhance the efficiency of the destination fax machine and the long-distance and local telephone circuits connected to a busy machine.

When the queue exceeds a certain limiting size, the destination SAFF will periodically insert and send a "Queue Report" (as a fax document) to the destination machine showing a list of the waiting messages. This list shows the originating machine identification, the time entered into the originator SAFF, the number of pages in the document, and the approximate time that the message will be delivered based on its position in the queue.

The user can advance a particular message to the head of the queue by calling the fax Service Number and supplying the desired message number, by using the voice response menus. The General Service unit 50 directs these instruction to the System Status and Control Unit 11, which in turn directs them to the Answer Function Host 85 through its Status and Control Interface 84.

Alternately, the originator can designate a priority level to a given fax message at the time it is dialed in (eg. by using a different access code). In this case, the destination SAFF will insert higher priority messages ahead of lower priority messages in the queue as they are received. The originator would normally pay a premium price for this service.

Another originator option is the time of delivery. If desired, the originator can specify the time of day which the message should be delivered. In this case the message is forwarded to the destination SAFF directly, but is not entered into the queue until the specified time. This can be used in combination with an assigned high priority to insert the message at the head of the queue at the appointed time.

When messages are finally delivered to the destination machine they are not immediately erased from the spool file 88 at the destination SAFF. Rather, they are maintained in a "Delivered Message" directory 90 for a period of time (typically six hours). A feature offered by this action is the opportunity for the subscribing recipient of a message to make additional copies, redirect, or forward copies of selected messages to other destinations. This is accomplished by calling the Service Number and selecting the appropriate choices from the voice response menus.

Security and Mail Boxes

It is not uncommon for documents of a sensitive nature to be sent by facsimile from place to place. This is often a problem, especially in a busy office or where a machine is nominally unattended during the transmission, in that the originator has no control over who may be standing by the machine when the document prints out, or who may leaf through a stack of faxes piled up in a hopper right after lunch.

This is a problem which others have attempted to deal with in a variety of ways. For example, Bond, U.S. Pat. Nos. 3,594,495 and 3,641,432, discloses a "radio facsimile postal system" which features the direct delivery of documents to specific addressees by facsimile via communications satellites. In this system, intended as a replacement for or supplement to the ordinary "paper" postal system, fax messages were directed from special public fax terminals operated by the post office to a central satellite earth-station. Here the messages were sorted according to their geographical destination for concentration and uplinking to a satellite servicing that area. The satellite then broadcasts all of the uplinked messages back to Earth.

In principle, anyone with a radio receiver in the satellite's service area could access any of the messages, so Bond built in a "privacy code" which operated with the receiver to allow the message to print out only on the desired machine. In reality, this privacy code was nothing more than an addressing signal which enables the selected fax receiving system. Thus, Bond's system is merely a restricted version of the services presently provided to fax users by the telephone networks. His privacy code function is the same as a telephone number: it selects which of a plurality of fax machines will actually receive the message. Unfortunately, his approach leads to exactly the security dilemma facing telephone fax users.

Chapman, U.S. Pat. No. 4,106,060, has approached the problem in a somewhat different way. He too discloses a facsimile-based mail system. However, in his system, the messages are directed by whatever means to a "paper" post office near the addressee, rather than the addressee's home or place of business. This post office then makes a paper copy of the the fax message, places it in an envelope, and delivers it to the addressee as ordinary mail. This is a reasonably effective solution to the security problem, but it can only be relied upon to provide "next day" delivery, and there are a number of other, competing alternatives for document delivery service on that time scale.

In the present invention, the security problem is addressed by a control variation of the destination SAFF queuing system. Messages which the originator wishes to designate as secure are temporarily directed to a auxiliary storage file 54, 89 in the Answer Function of the destination SAFF called a "Mail Box". Instead of being delivered to the destination machine, a report is sent to that machine indicating that a secure message is waiting for a particular addressee. Optionally, a voice message may be directed to a designated telephone number, such as a voice mail box, by the General Service Control 50.

This feature works in the following way. Each individual SAFF is assigned its own unique telephone exchange code or codes (typically indicated by the first three digits of a seven digit local number). Thus, the SAFF appears to the world as if it were a distinct telephone exchange(s), separate from all other exchanges in that area code region. All subscriber's to a given SAFF are assigned their fax telephone numbers with that exchange prefix. Subscribing individuals wishing Mail Boxes (typically associated with a "default" fax machine) are issued "fictitious" telephone numbers which actually terminate in fax Mail Boxes, rather than in an actual telephone line.

Mail Box numbers are published so that correspondents may use them. In addition, each individual is also given a secret security code or PIN number which will access his or her box. The host computer managing the SAFF maintains a list that relates each fictitious number with the individual's name, the security code, and the real telephone number of the default destination machine. This default machine is the one to which messages and reports will normally be sent, when appropriate. In addition to a default fax machine, the user may also define a default voice telephone number which may be either a telephone answered by a human or a computer-managed voice mail box, as is known in the art. When such a voice telephone is also defined, a voice version of the various system messages and reports will also be sent to this number.

An originator wishing to send a secure message merely dials the (fictitious) Mail Box telephone number at the time the document is sent. The system directs the message to the Mail Box file 89 in the destination SAFF associated with that number, and the Answer Host 85 sends a "Message Waiting" report to the default destination fax machine through the Local Interface 83. If a default voice telephone number has also been defined in this report, this report is also sent to that number. The user has the option of programming or instructing the system, through the General Service Control 50, to have either or both the default fax and the default voice reports forwarded to another number. For example, the person who is traveling could program or require fax or voice Message Waiting announcements to be directed to a hotel fax or telephone number. When voice announcements are made, the system will give the (human) recipient of the call the option of pressing a touchtone key to repeat the announcement as often as necessary to transcribe the message. If more than one message is in the Mail Box queue, then this report lists them all.

In order to get the fax document actually sent to the destination, the security code must be sent back to the destination SAFF. Typically, this would be done by the addressee dialing his or her own Mail Box number. Since this call originates from a "normal" telephone 34 over Ordinary Local Lines 40, rather than the fax's SAFF Directed Lines 38, the call is directed to the Off-net Incoming Screener 48 in the (destination) SAFF which functions in conjunction with a mailbox service control 49. This unit recognizes that the call is not a fax transmission and thus treats it as a voice service request. A voice response system then prompts the caller to key in the security code. When the correct code is supplied, the SAFF system announces the number of messages waiting and, if desired, the message codes of each. Mail Box contents are maintained in a queue 89 just as are "regular" spool files. Thus, the user is also given the opportunity to reorder the messages within a Mail Box Delivery queue, through the System Status and Control units 11, 20 in the same way as other messages.

The system finally permits the addressee to make a selection of messages for immediate release, and provides an opportunity to "redirect" them to a fax machine 3 other than the default machine over ordinary local lines 39. The SAFF then releases the selected documents and moves them to the head of the appropriate destination Delivery Queue 88 for immediate delivery. As described earlier, the recipient of the various messages may then choose to provide automated fax or voice replies to selected messages.

When messages are accepted into the SAFF system and arrive at a mail box, The Answer Function of the destination SAFF issues a "Posting Report" which is directed back to the Originator in the manner described for other reports. The report is similar to a Delivery Report, except that it indicates that the message has been received by the mail box. When the Mail Box Queue is actually read by the addressee the Destination SAFF sends an actual Delivery Report to the originator indicating the date and time of delivery and so forth.

Another advantage of the Mail Box system is that it can provide a convenient way for individuals who are away from their "home" machine to still have access to their documents. Such individuals may call in to their Mail Box number to hear from the voice response unit whether they have any messages waiting. By use of the redirection feature, messages sent to a fax Mail Box can be accessed by an individual with the security code from any telephone with a fax machine.

For example, a person on a business trip can have all his or her fax documents directed to their Mail Box. Upon arriving at a hotel that has a fax machine, the traveler places a call to the Mail Box number and supplies the information outlined above, including the telephone number of the hotel fax machine. The SAFF then calls the hotel machine and dumps the queue of waiting documents.

Figure 8:
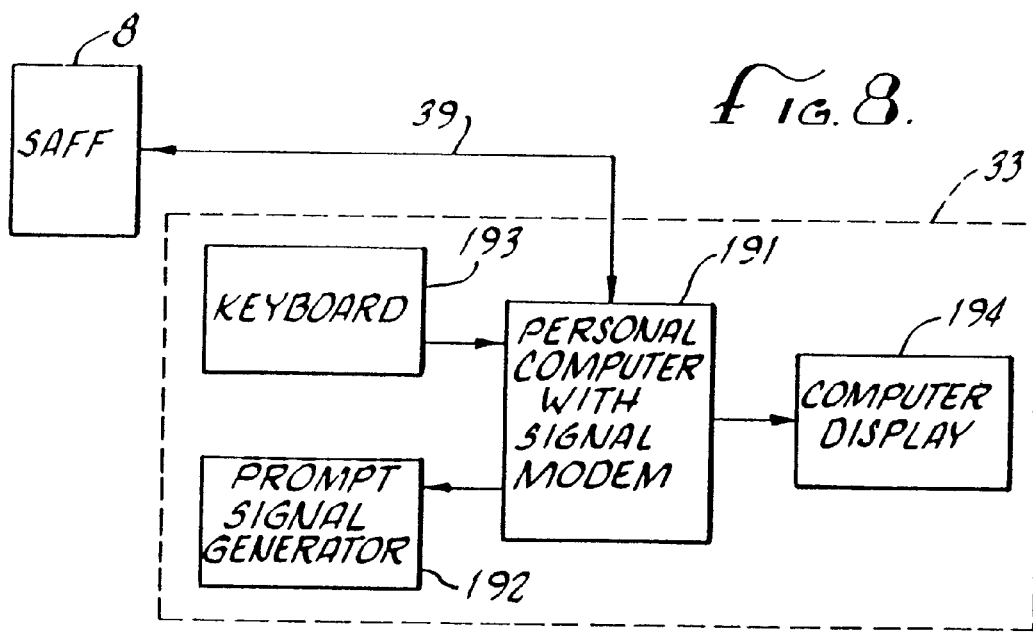
FIG. 8 shows a block diagram of an embodiment of the paperless facsimile terminal.

Another aspect of the Mail Box function is support for paperless fax terminals 33, such as those which provide a volatile display of the fax image on a computer display. Typically, this terminal is shown in FIG. 8 which includes a small, modem-equipped personal computer 191 and a computer display 194. The terminal can also include a keyboard 193 for entering necessary access code or other information.

In this circumstance, the paperless terminal initiates the Mail Box transaction operating as a computer terminal (rather than a fax terminal), using a computer terminal emulator program such as those well known in the art. The incoming call from an ordinary line 40 is recognized by the Off-net Incoming Screener 48 as not being a fax transmission and is passed to the Mail Box Service Control 49. This unit recognizes the call as a computer, rather than voice call and enables a computer, rather than voice, response system.

The user and the Mail Box Service Control 49 then communicate by way of some computer communications code such as ASCII.

The system presents the same security code requests as the voice system and provides the same basic user options including message queue listings, queue reordering and so forth. Unlike the voice system, however, it is not necessary to redirect the fax messages to another telephone. The paperless terminal software recognizes simple code sequences sent by the Mail Box Service Control 49 and can be switched under Mail Box Service control from the ASCII computer terminal mode to the fax terminal mode. Thus, the user may select messages from the queue in the computer mode and then the Mail Box Service system will automatically switch the terminal to fax mode, send the fax messages, and then return the terminal to computer mode.

In this way, the paperless terminal user can engage in an ongoing dialogue with the Mail Box Service Control, doing queue manipulations, reading faxes, sending automated fax or voice responses and so forth. When a fax message is read by a paperless terminal on a screen, the user may elect to have the message left in the queue for later disposal and to have a cover page added to indicate the date, time and terminal telephone number from which the fax was originally read. The user may also redirect the message to be printed on an ordinary "hardcopy" device, such as a fax device or a printer. In addition, this mode will also permit the transmission of outgoing fax messages from the paperless terminal and access to the functions of the General Service Control 50, all without the need to exit the system and dial in again. This permits a single incoming call over a line 40 to permit the user to access essentially all of the services available from the SAFF.

Figure 9:
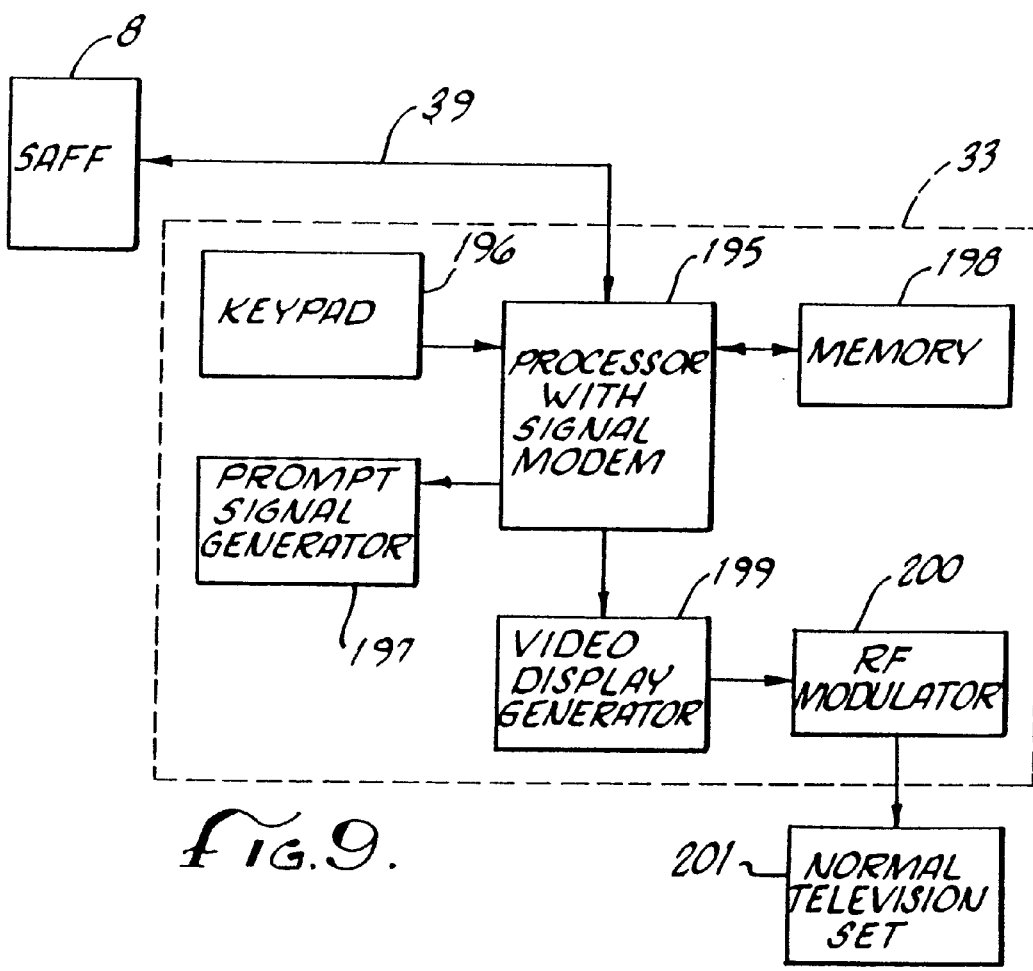
FIG. 9 shows a block diagram of another embodiment of the paperless facsimile terminal which can utilize an ordinary television set for display of facsimile messages.

In another approach, the paperless fax terminal can act as an originating machine and a designation machine, in place of ordinary facsimile machine. In this case, the paperless fax terminal may be used in cooperation with a telephone or provided with a sound or flash light generator 192 or 197 as shown in FIGS. 8 and 9 for prompting the addressee to communicate with the SAFF system for receiving a facsimile message while the SAFF attempts to transmit a facsimile message. The SAFF also provides the other services to the paperless fax terminal as provided to the ordinary facsimile machine. For example, the SAFF will temporarily store the fax message and periodically retry to communicate with the destination paperless fax terminal if the terminal is busy or otherwise unavailable to receive at this time.

A companion aspect of this system is a Mail Box Reader device 33 as shown in FIG. 9 which is an alternative of the paperless fax terminal described above. This device is a relatively low-cost adapter which connects the user's telephone to an available ordinary television set to form a simple paperless fax terminal. The Reader device 33 contains a modem capable of both computer and fax operations, programs for these operations, memory 198 to store an incoming document or documents, a processor 195 for controlling the device, a keypad 196 for the input of user commands, a video display generator 199 and a RF modulator 200 suitable for supplying a display signal to the ordinary television set 201.

The Mail Box Service Control 49 recognizes the Mail Box Reader as a distinct terminal type and supports abbreviated command sequences from its more limited keypad. In addition, it supports paging through sections of a document so that a user can view documents which may be too large to fit into the Reader's memory in one place.

The Mail Box Reader itself has a "zoom" mode that magnifies the image on the screen by mapping a smaller segment of the Reader's memory to the screen. This permits one to overcome the fact that the resolution of the television set may be too limited for a readable display of some of the finer-detailed features of some fax images. The Reader's keypad 196 permits scrolling through messages, both vertically and horizontally in both the normal and zoom mode. Vertical scrolling is transparently coordinated with the Mail Box Service Control's paging functions so that if one scrolls off the end of the segment of a long document stored in memory, the Mail Box Service Control will automatically supply the next segment.

Broadcasting

The queuing, Mail Boxes, and security codes are all derivative benefits of the spooling of messages at the destination SAFF. There is a counterpart advantage to the originator SAFF's spooling as well. Since the originator SAFF maintains a copy of each message, that copy can be used to broadcast messages to multiple destinations.

This can be initiated in a number of ways. For example, the user can dial in a code prefix indicating that a list of destination numbers is to follow. The numbers are then entered and finally another code is entered to signal "end of list". The Originate Host 70 recognizes these inputs and attaches them to the message which follows. As an alternative, the user can store different numbered broadcast telephone lists in the Originate SAFF mass storage files 69 (entered much as described above) and invoke them simply by dialing a two or three digit "short-cut" code. In either case, from there the fax transmission to the originator SAFF proceeds normally.

Upon reception of the list and the document, the originator SAFF proceeds to open as many local loop-back or long-distance lines as it can to deliver the broadcast message to the various destinations, essentially simultaneously. Although the originator is billed for making a number of different calls, in fact the originating machine is only tied up for the time required to make one call. Furthermore, the full power of the delivery system is asserted for each destination machine, including reporting, redials, queuing, and so forth.

A feature related to broadcasting is the redirection of messages by the originator. Since fax messages are spooled at the originator SAFF and held for a period of time even after delivery (typically six hours), the originator can dial the Service Number any time during this period and direct a copy of the spooled message to be sent to other destination machines.

Communications With Non-subscribers

Thus far, the discussion has presumed that both the originator and answerer were subscribers to the SAFF system. It is quite reasonable to assume that subscribers will wish to send or receive fax messages with non-subscribers, as well. While the services provided by the SAFF are more limited in such cases, nevertheless, the system both anticipates and enhances communications with non-subscribers for the benefit of the subscribers.

When a subscriber originates a call to a non-subscriber the delivery process is almost identical to subscriber-to-subscriber calls. The fax data is forwarded to the Answer Function of the appropriate destination SAFF and delivery is pursued, all in the usual way. For the benefit of the subscribing originator, the message is stored in the usual way at the destination SAFF until delivery is completed. If multiple SAFF-processed messages arrive before the delivery is complete, a temporary Delivery Queue will be created and used as required. However, since the non-subscriber will have no account in the system, attempts to use the Service Number to manipulate the queue, forward messages, make multiple copies, and use the other special services available to a subscribing answerer, will be unsuccessful.

Calls originated by a non-subscriber directed to a subscribing answerer move by a somewhat different mechanism. As noted, each SAFF appears to the world as a distinct telephone exchange and all subscriber's to a given SAFF are assigned their fax telephone numbers with that exchange prefix. Consequently, all calls directed to a SAFF subscriber eventually end up at the subscriber's SAFF, whether they originated from within the SAFF system network or not. Messages originating "off-network" can arrive by any route. For example, they may be truly local calls, or they may be long-distance calls which arrive over any available long-distance network.

In any case, messages originating from a non-subscriber 33 are delivered to the answering fax machine's SAFF by the local lines 39 provided by the local telephone company. They are answered by the SAFF's Off-net Incoming Screener 48, which, upon noting that they are fax transmissions, directs the calls to the Originate Function 9 of that SAFF. From that point, the call is treated as if it were a local fax call and it is passed over to the Answer Function 12 via the Local Call Loop-back 13 for delivery to the subscriber.

In this situation, an Acceptance Record will be returned to the originating machine, but no further originator services are provided. On the other hand, the answering subscriber has the full range of Answer Function available.

Charges and Detailed Billing

Normally, the Originate Function of the originator SAFF has ultimate responsibility for the management of outgoing messages. It initiates all connections to the Answer Functions of the various SAFFs with which it must communicate. It is the node to which all reports concerning message status and disposition must flow. It interrogates Answer SAFFs when extraordinary updates are required. Consequently, the Originate Function is also the focus of charging data.

The telephone company presumably charges for all of the various services provided by this system. The method, algorithm, and rates are determined by actual costs and applicable regulations. Typically, the user would be billed for telephone connect time, toll charges, extraordinary services, such as those provided by calling the Service Number, the amount of mass storage space consumed as a function of time, and so forth.

One of the user services for which a special charge might be made is a subscriber's customer specific billing system. In this option the user can "flag" each fax transmission with a keyed-in prefix which contains a user customer, client, or project number. This number is stored as a key field in the Transaction File for that call. Thus, when the telephone bill is prepared, the billing computer can sort the subscriber's bill on this field and present the user with a list of all fax messages, total usage time, number of pages, and related charges, all grouped by the subscriber's own customers, clients, or projects. Furthermore, it can accept the subscriber's particular algorithm for billing calls to customers or clients and generate a column showing what the subscriber will bill for the service (as a separate matter from what the SAFF system and the telephone company have billed the subscriber). This can be of great assistance in attributing costs and billing customers for services rendered.

Software Control

In the preferred embodiment, each of the principal units of the SAFF such as described in FIGS. 2,3, and 4 is controlled by its own computer processing unit or units. These units are interrupt-driven computers which are connected together by the System Status and Control unit 11. This unit is an electronic switch yard for control communications between the Originate, Answer, and other units within a given SAFF, as well as the the other SAFFs in the system through the control long-distance trunks 15. While there are many tasks which the various control processors must perform to handle fax operations, the primary ones are intercepting incoming calls, either for fax forwarding or service requests, and delivering the fax messages to their destinations. The general software organization of these principal activities is shown in FIGS. 5, 6, and 7. It should be noted that these figures are simplified and intended to be generally descriptive. For example, some procedures illustrated here as sequential (for the sake of simplicity) can actually be performed concurrently. Likewise, not every function of the system is represented in detail. Generally speaking, similar results also can be obtained with a number of other obvious arrangements of the functional blocks.

Broadly speaking, fax messages addressed to the Originate Function of a SAFF arise either through the special SAFF Directed Local Lines 4 (FIGS. 2 and 3) as a result of direct connection or dialing a special access code, or they arise from Ordinary Local Lines (off-net lines) 39, 40, 63. Those which arrive via off-net lines are processed first by the Off-net Screener 48, which may direct them to either the Originate Function 9 or to Mail Box Service 49. FIG. 5, therefore combines all three of these related functions.

Figure 5B:
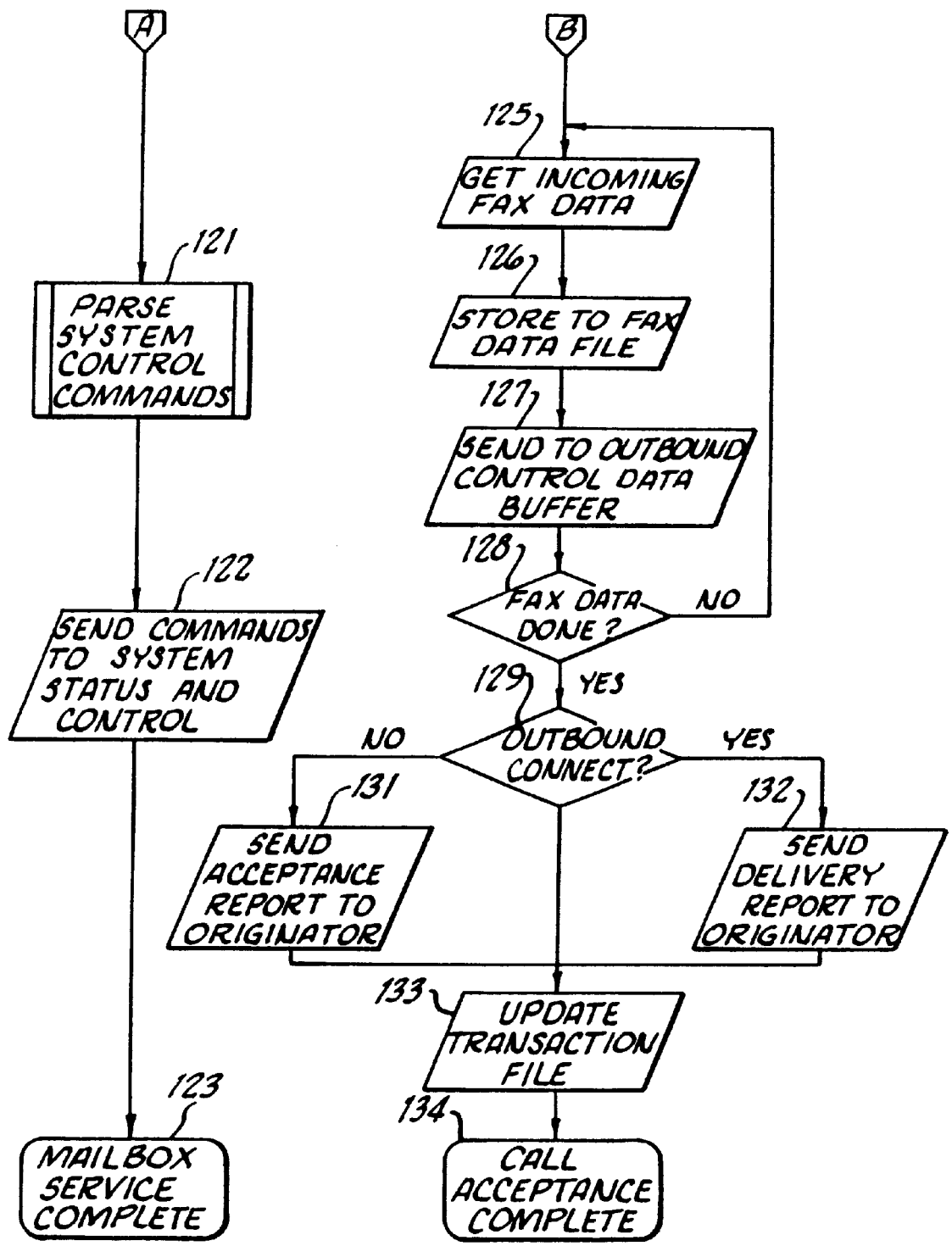

At the outset, one of the two incoming call interfaces 64 and 65 signals the Host Computer 70 that it is beginning to process a call at 100 in FIG. 5a. These units have their own buffer capability and can tolerate some delay before the Host responds. Ultimately the Host must decide whether it is responding to an on-net or off-net call 101. If it is an off-net call there are two possibilities (excluding wrong numbers) 102: it may either be a fax call, in which case it is from a non-subscriber to a subscriber, or it is a mail box service call. If it is a fax call then the billing for services must be directed to the subscribing destination addressee 112. From that point it is handled like an on-net call as will be described shortly.

If it is not a fax call, then it is presumed to be a mail box service call 103, and the system then determines whether it is a computer or voice-based request. The caller is presented with a voice response menu or computer menu 104 for such service, as appropriate. The user responds to these prompts with a touchtone keypad, verbally, or with computer keystrokes 105 and a decision ladder, shown succinctly as 107 selects the desired implementation routine 108, 109, 110 (for brevity only three typical choices are shown, and this element is actually a loop which will permit multiple commands). The chosen routine passes parameters to a command parser 121 (FIG. 5b) which prepares a command statement which is then sent 122 to the System Status and Control unit 11, through the interface 72. This command will be passed to the Answer Host 85 through its interface 84 for actual action on the Mail Box Queue 89. If the service requires a response to the caller the transmission path is reversed. When the operation is completed 123 the call is terminated.

If on the other hand, the original call is found at 101 to be an on-net call, billing is generally directed at the originator 113 and the Host 70 begins the opening digital dialogue 114 with the calling machine, acting in place of the destination machine. This dialogue includes gathering and storing the fax identifications, originating and destination telephone numbers and so forth 116. The Host opens a Transaction File and links it to a data file 117 for the expected data, and then stores all of the call and file information 118 keyed to the Message Code. The destination telephone number and other information are passed almost immediately 119 to the Outbound Controller 74, which then opens a temporary buffer to hold the fax message in case immediate contact can be established, and it attempts to establish that contact through the destination SAFF.

In pursuing this contact, the Outbound Controller 74 examines the status of available trunks. If trunks are available, it will immediately attempt to connect with the destination SAFF, otherwise it will defer the call until a trunk is available. In the event of a broadcast message, the Outbound Controller will select the number of trunks to use simultaneously based on the percentage of the trunks already in use, in order to avoid tying up all of the SAFF's outgoing capacity with a single message task. Other considerations can affect these usage choices depending on the details of the setting of the system.

The Host then enters a loop which gets the incoming fax data 125 (FIG. 5b) from the On-net 64 or Off-net 65 Interface's buffer and stores each byte in the fax data file 126 while sending another copy 127 to the Outbound controller 74 until the incoming data is complete 128. The Host then checks 129 with the Outbound controller to see if it was successful in making immediate connection with the destination machine. If it was successful and a satisfactory transfer occurred, then a Delivery Report is sent back 132 to the originating machine before it leaves the line. Otherwise, an Acceptance Report is sent 131, and in either case the outcome is reported 133 to the Transaction File and the call is terminated 134.

Figure 6A:
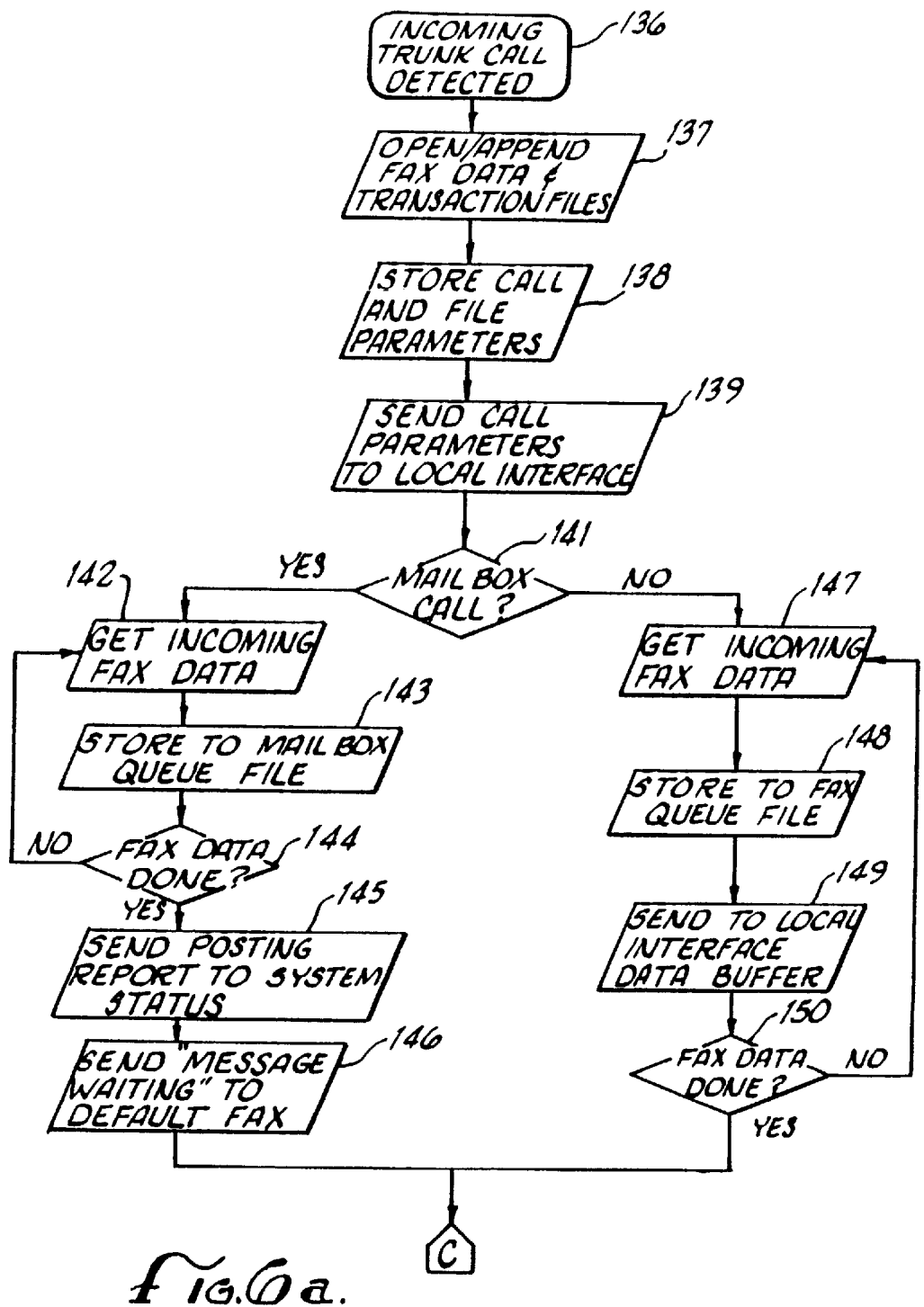
FIGS. 6a and b show a flow chart describing the general processing steps required to handle the delivery of a fax message incoming to the Answer Function of a SAFF, as described particularly in FIGS. 2 and 4.
Figure 6B:
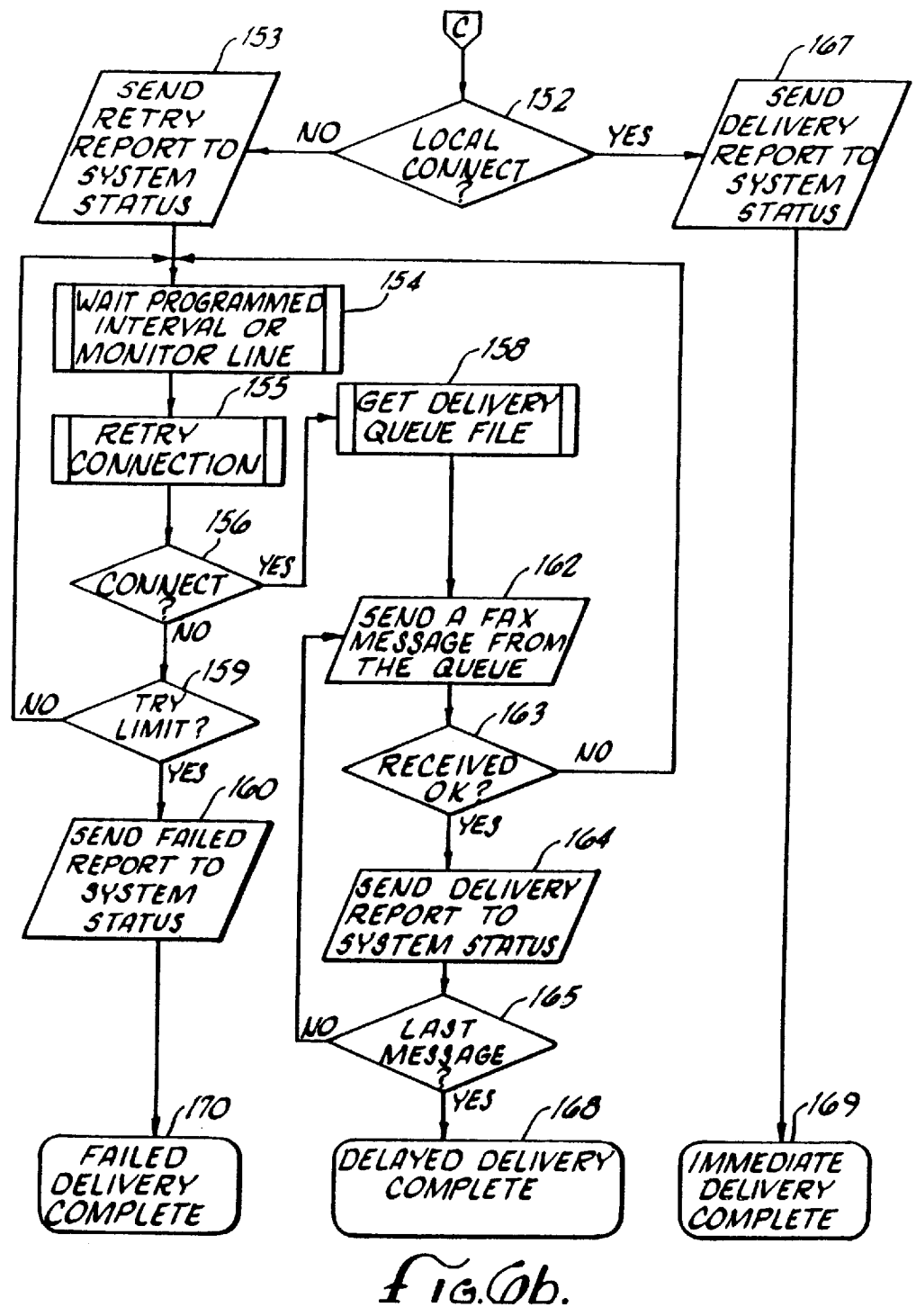
Figure 7:
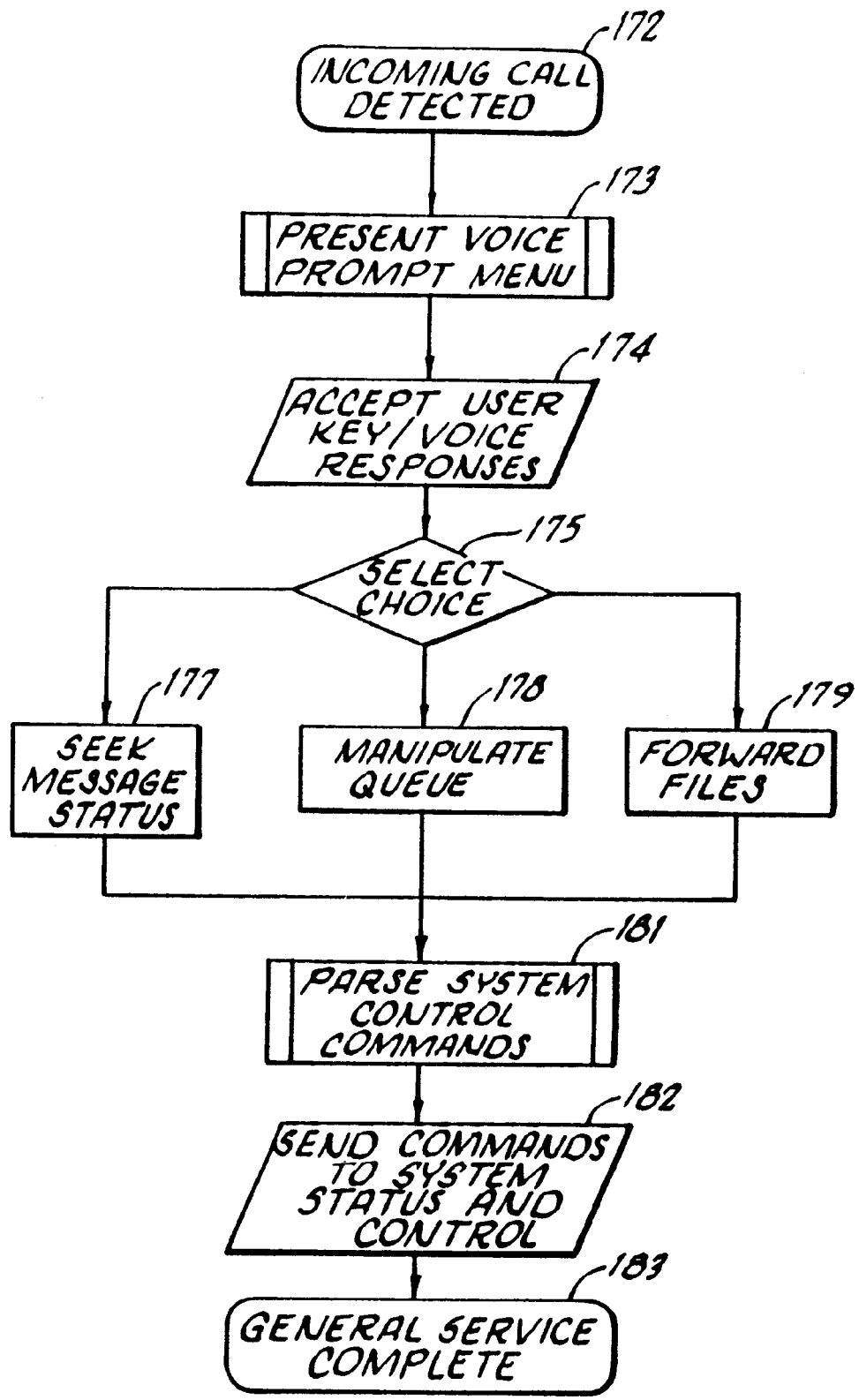
FIG. 7 shows a flow chart of the general processing steps required to handle a service request in the General Service unit of a SAFF, as described particularly in FIG. 2.

A complementary set of activities occurs in the Answer Function of the destination SAFF as described in FIGS. 6a and b. Here an incoming call is detected 136 by the Inbound Control 92 (FIG. 4). The Answer Host Computer 85 then opens a new fax data and Transaction file for the message if there is no current queue for that destination machine, or it prepares to append the data to an existing queue 137. The various call and file parameters are linked and stored 138 and the call parameters are passed through 139 to the Local Interface 83, which then decides 141 whether the call is addressed to a "real" fax number, or a fictitious number terminating in a mail box. If the number is real the Local Interface attempts to contact the destination machine for immediate delivery.

The Host then enters a loop where it gets the incoming data 147, stores it 148 in the fax Delivery Queue, and passes it through 149 to the Local Interface buffer. When the Host determines that the fax transfer is complete 150, it then checks 152 (FIG. 6b) to see if the Local Interface has been able to make immediate delivery. If it has, the Host initiates the transmission of the Delivery Report 167 back through its Status and Control Interface 84 to the System Control and Status unit 11, which in turn updates the Transaction File and sends it back to the originator SAFF over Trunk 15. It is this communication which ultimately results in the immediate Delivery Report described previously. The transaction in then terminated 169.

If immediate connect is not established a Retry Report is sent 153 back through the System Status and Control unit and the Retry sequence begins. The Retry criteria can be varied 154, both in place and with the SAFF setting. For example, if the SAFF is integrated into a local exchange, the SAFF can actually monitor the desired line and simply wait for it to become available. In other settings it will be necessary for the SAFF to actually redial at prescribed intervals. In any case attempts to connect are made 155 and if they are not successful 156 a counter or timer is checked 159 to see if the retry limit has been exceeded. If not, the process is repeated and if so, a Failed Delivery Report 160 is sent back through the system and the effort terminated 170.

If the retry effort is successful, the Delivery Queue is retrieved 158 and message by message 162 the queue is dumped, with a pause 163 after each message to confirm receipt, send a Delivery Report 164 and to check for end of queue 165. If a message fails during the queue dump, the retry sequence at 154 is resumed at the failure point and the process repeated to a conclusion. When the last message has been received satisfactorily, the transaction is terminated 168.

If it is determined at 141 (FIG. 6*a*) that this is a mail box call, a loop is entered which gets the fax data 142 and stores it 143 in the appropriate Mail Box Queue. When the end of message is detected 144, a Posting Report 145 is sent back through the system and a Message Waiting Report 146 is sent forward through the system to the default destination machine.

General Service calls always arrive on Ordinary Local Lines 5. Upon detection and answering 172, the voice response menu is presented 173 to the user. As with the Mail Box Service, the user keys in responses or gives them orally 174 and a decision ladder 175 identifies the desired service routine such as 177, 178, or 179. Here again only a few of the possible choices have been shown for sake of illustration and looping for multiple service requests is provided. The selected service routine generates command parameters which are parsed 181 as system commands and sent 182 to the System Status and Control unit 11 for execution. Upon completion of all requests the call is terminated 183.

What has been described are the presently preferred embodiments of a system and method for providing a comprehensive interactive facsimile message management system embedded in a switched telephone network. It should be apparent that many modifications to the system and the method are possible without departing from the true spirit and scope of the invention.

What is claimed is:

1. A method for operating a facsimile store and forward facility to facilitate facsimile communications, said method comprising steps of:
   providing a facsimile store and forward facility accessible through a switched telephone network;
   assigning to each system subscriber of a plurality of system subscribers a unique destination telephone number, wherein the dialing of the unique destination telephone number of each system subscriber results in the related telephone call being switched by a switched telephone network to the store and forward facility
   receiving over time at the store and forward facility a plurality of telephone calls, each call of said plurality of telephone calls being switched to the store and forward facility by the switched telephone network as result of a sender dialing one of the unique destination telephone numbers, whereby each such received call results in an originating telephone call connection being made,
   receiving during the originating telephone call connections, at the facsimile store and forward facility, facsimile messages from transmitting facsimile machines;
   storing the facsimile messages at the facsimile store and forward facility;
   receiving at the facsimile store and forward facility a call from a paperless facsimile device; and
   transmitting facsimile messages stored in the facsimile store and forward facility from the facsimile store and forward facility to the paperless facsimile device.

2. The method of claim 1, further comprising a step, before the transmitting step, of receiving from the paperless facsimile device at least one delivery request for at least one facsimile message stored in the facsimile store and forward facility.

3. The method of claim 2, further comprising a step of communicating to the paperless facsimile device a list of facsimile messages stored in the facsimile store and forward facility.

4. The method of claim 2, further comprising steps, after the transmitting step, of: receiving from the paperless facsimile device at least one additional delivery request for at least one additional facsimile message stored in the facsimile store and forward facility; and transmitting the at least one additional facsimile message stored in the facsimile store and forward facility from the facsimile store and forward facility to the paperless facsimile device.

5. The method of claim 1, wherein the storing step includes storing the facsimile messages in facsimile mailboxes associated with particular subscribers.

6. The method of claim 5, further comprising a step, before the transmitting step, of receiving from the paperless facsimile device a security code required for access to a particular facsimile mailbox.

7. The method of claim 5, wherein multiple facsimile messages associated with a subscriber are stored in a facsimile mailbox associated with the subscriber, wherein the method further comprises a step of receiving from the paperless facsimile device a mailbox manipulation command selecting for delivery a subset of the facsimile messages stored in the facsimile mailbox, and wherein the transmitting step includes transmitting only the selected subset of facsimile messages.

8. The method of claim 1, further comprising the step of associating a unique mailbox defined in at least one computer storage device with each particular subscriber of the plurality of subscribers, and wherein said storing step includes at least the step of directing facsimile messages received over an originating telephone call connection to the mailbox associated with the particular subscriber to whom the respective dialed one of the unique destination telephone numbers is assigned.

9. The method of claim 8, wherein the step of associating includes associating, with particular subscribers, mailboxes defined in a computer storage device geographically separated from the store and forward facility, and further comprising the step of directing a facsimile message received at the store and forward facility to a mailbox defined in the computer storage device geographically separated from the store and forward facility.

10. The method of claim 8, wherein the method further comprises the step of forwarding, while a facsimile message is still being received during an originating call connection, at least some of the message from the store and forward facility to at least a second store and forward facility geographically separated from the store and forward facility.

11. The method of claim 10, wherein the forwarding step includes the step of transmitting by a most expedient communication mechanism.

12. The method of claim 10, wherein the forwarding step includes delivery over the switched telephone network.

13. The method of claim 10, wherein the forwarding step includes delivery employing digital communications.

14. The method of claim 5 or 8, further including the step of, in response to instructions received from a subscriber, transmitting facsimile messages stored in that subscriber's mailbox to a facsimile machine designated by that subscriber in the instructions.

15. The method of claim 5 or 8, wherein a subscriber accessing his mailbox by a paperless facsimile device may view facsimile messages stored in his respective mailbox.

16. The method of claim 5 or 8, wherein the mailbox further comprising the steps of a particular subscriber is defined in a mass storage remote to the store and forward facility, and directing the facsimile message to a mailbox defined in the mass storage remote to the store and forward facility.

17. The method of claim 5 or 8, wherein the mailbox of a particular subscriber is defined in a mass storage local to a second store and forward facility geographically separated from the store and forward facility, and further comprising the steps of directing the facsimile message to a mailbox defined in the mass storage local to the second store and forward facility.

18. The method of claim 5 or 8, wherein the step of receiving a call from a paperless facsimile device comprises the steps of:
   establishing a modem connection between the store and forward facility and a paperless facsimile device, at the initiation of the paperless facsimile device; and
   wherein the transmitting step includes,
      granting to the paperless facsimile device access to a particular subscriber's mailbox;
      allowing a user at the paperless facsimile device to view a facsimile message stored in the respective mailbox;
      and then redirecting the fax message to a remote facsimile device in response to commands issued from the paperless facsimile device.

19. The method of claim 18, and wherein the granting, allowing and redirecting steps are performed only after receipt at a store and forward facility of a unique PIN number of the subscriber associated with the respective mailbox.

20. The method of claim 5 or 8, wherein the step of receiving a call from a paperless facsimile device includes the steps of:
   granting to a remote paperless facsimile device access to a particular subscriber's mailbox; and the transmitting step includes
      allowing a user at the remote paperless facsimile device to view a facsimile message stored in the particular subscriber's mailbox.

21. The method of claim 20, and wherein the granting and allowing steps are performed only after receipt at a store and forward facility of a unique PIN number of the subscriber associated with the respective mailbox.

22. The method of claim 5 or 8, wherein the step of receiving a call from a paperless facsimile device includes:
   receiving a call at the store and forward facility over the switched telephone network from a remote paperless facsimile device; and
   granting to the remote paperless facsimile device access to a particular subscriber's mailbox; and
   the transmitting step includes steps of allowing a user at the remote paperless facsimile device to view a facsimile message stored in the particular subscriber's mailbox.

23. The method of claim 22, and wherein the granting and allowing steps are performed only after receipt at a store and forward facility of a unique PIN number of the subscriber associated with the respective mailbox.

24. The method of claim 5 or 8, wherein the step of receiving a call from a paperless facsimile device includes:
   granting to a remote paperless facsimile device access to a particular subscriber's mailbox during a communication session initiated by the remote paperless facsimile device; and
   the transmitting steps includes, in response to instructions received from the remote paperless facsimile device during the communication session, transmitting facsimile messages stored in a particular subscriber's mailbox to the remote paperless facsimile device.

25. The method of claim 24, and wherein the granting and transmitting steps are performed only after receipt at a store and forward facility of a unique PIN number of the subscriber associated with the respective mailbox.

26. The method of claim 24, further comprising the step of providing to a subscriber at the remote paperless facsimile device, during the communication session, a plurality of user options selected from the group consisting of: viewing a queue of facsimile messages in the particular subscriber's mailbox; selecting facsimile messages from the queue; deleting messages from the queue; arranging the queue according to priority; reading fax messages in the particular subscriber's mailbox; redirecting a facsimile message in the particular subscriber's mailbox to any facsimile device; and redirecting a facsimile message in the particular subscriber's mailbox to a printer.

27. The method of claim 26, and wherein the granting, transmitting and providing steps are performed only after receipt at a store and forward facility of a unique PIN number of the subscriber associated with the respective mailbox.

28. The method of claim 24, further comprising the steps of providing to a subscriber at the remote paperless facsimile device, during the communication session, at least the user options consisting of: viewing a queue of facsimile messages in the particular subscriber's mailbox; selecting facsimile messages from the queue; deleting messages from the queue; arranging the queue according to priority; and reading fax messages in the particular subscriber's mailbox.

29. The method of claim 28, and wherein the granting and providing steps are performed only after receipt at a store and forward facility of a unique PIN number of the subscriber associated with the respective mailbox.

30. The method of claim 5 or 8, further comprising the step of, in response to instructions received from a subscriber, transmitting facsimile messages stored in that subscriber's mailbox, via the public switched telephone network, to any particular facsimile device designated in the instructions by the subscriber, whereby a subscriber who is traveling or otherwise away from the fixed location of his facsimile device may have facsimile messages collected in his mailbox, and retrieve them from any location where any other facsimile device is situated.

31. The method of claim 30, and wherein the transmitting step is performed only after receipt at at least one store and forward facility of a unique PIN number of the subscriber associated with the respective mailbox.

32. The method of claim 17, further comprising the step of, in response to instructions received from a subscriber, transmitting facsimile messages stored in that subscriber's mailbox at the second store and forward facility, via the public switched telephone network, to any particular facsimile machine designated in the instructions by the subscriber, whereby a subscriber who is traveling or otherwise away from the fixed location of his facsimile machine may have facsimile messages collected in his mailbox, and retrieve them from any location where any other facsimile machine is situated.

33. The method of claim 32, and wherein the transmitting step is performed only after receipt at a store and forward facility of a unique PIN number of the subscriber associated with the respective mailbox.

34. The method of claim 16, further comprising the step of, in response to instructions received from a subscriber, transmitting facsimile messages stored in that subscriber's mailbox at the remote storage, via the public switched telephone network, to any particular facsimile machine designated in the instructions by the subscriber, whereby a subscriber who is traveling or otherwise away from the fixed location of his facsimile machine may have facsimile messages collected in his mailbox, and retrieve them from any location where any other facsimile machine is situated.

35. The method of claim 34, and wherein the transmitting step is performed only after receipt at a store and forward facility of a unique PIN number of the subscriber associated with the respective mailbox.

36. The method of claim 8 further including the steps of:
recognizing that a particular telephone call switched to the store and forward facility by the switched telephone network as a result of a particular subscriber dialing his unique destination telephone number, is not a fax transmission, and establishing a mailbox control session; and providing to the particular subscriber during the mailbox control session a plurality of user options selected from the group consisting of: viewing a queue of facsimile messages in the particular subscriber's mailbox; selecting facsimile messages from the queue; deleting messages from the queue; arranging the queue according to priority; reading fax messages in the particular subscriber's mailbox; displaying at a computer terminal a facsimile message stored in the particular subscriber's mailbox; redirecting a facsimile message in the particular subscriber's mailbox to a facsimile device; and redirecting a facsimile message in the particular subscriber's mailbox to a printer.

37. The method of claim 36, wherein the mailbox of the particular subscriber is defined in a computer storage device geographically separated from the store and forward facility with which the originating telephone call connection was made.

38. The method of claim 36, wherein the mailbox of the particular subscriber is defined in a computer storage device geographically separated from the store and forward facility with which the mailbox control session is established.

39. The method of claim 36, wherein the providing step is performed only after receipt at a store and forward facility of a unique PIN number of the particular subscriber.

40. The method of claim 36, and wherein the store and forward facility with which the originating call connection is made and the store and forward facility with which the mailbox control session is established.

41. The method of claims or 8, wherein the transmitting step comprises the step of, during a communication session initiated by a paperless facsimile device operating in a computer communication mode, transmitting facsimile messages stored in that subscriber's mailbox to the paperless facsimile device for display on a screen.

42. The method of claim 41, and wherein the transmitting step is performed only after receipt at a store and forward facility from the paperless facsimile device of a unique PIN number of the subscriber associated with the respective mailbox.

43. The method of claim 41, further comprising the steps of providing to the subscriber at the paperless facsimile device, during the communication session, a plurality of user options selected from the group consisting of: viewing a queue of facsimile messages in the particular subscriber's mailbox; selecting facsimile messages from the queue; deleting messages from the queue; arranging the queue according to priority; reading fax messages in the particular subscriber's mailbox; redirecting a facsimile message in the particular subscriber's mailbox to a facsimile device; and redirecting a facsimile message in the particular subscriber's mailbox to a printer.

44. The method of claim 41, further comprising the steps of providing to the subscriber at the paperless facsimile device, during the communication session, at least the user options consisting of: viewing a queue of facsimile messages in the particular subscriber's mailbox; selecting facsimile messages from the queue; deleting messages from the queue; arranging the queue according to priority; and reading fax messages in the particular subscriber's mailbox.

45. The method of claim 44, further comprising the steps of, during the communication session, receiving at a store and forward facility from the paperless facsimile device an outgoing facsimile message for delivery to an outbound destination and, in response to instruction received from the paperless facsimile device, transmitting the facsimile message from the store and forward facility to the outbound destination.

46. The method of claim 41, further comprising the steps of, during the communication session, receiving at a store and forward facility from the paperless facsimile device an outgoing facsimile message for delivery to an outbound destination and, in response to instruction received from the paperless facsimile device, transmitting the facsimile message from the store and forward facility to the outbound destination.

47. The method of claim 41, wherein mailboxes of particular subscribers are in a computer storage device geographically separated from the store and forward facility, and wherein the transmitting step includes transmitting a facsimile message from a mailbox in the computer storage geographically separated from the store and forward facility.

48. The method of claim 36, wherein the providing step includes the step of providing to the subscriber at the paperless facsimile device, during the mailbox control session, at least the user options consisting of: viewing a queue of facsimile messages in the particular subscriber's mailbox; selecting facsimile messages from the queue; deleting messages from the queue; arranging the queue according to priority; and reading fax messages in the particular subscriber's mailbox.

49. The method of claim 48, further comprising the steps of, during the mailbox control session, receiving at a store and forward facility from the paperless facsimile device an outgoing facsimile message for delivery to an outbound destination and, in response to instruction received from the paperless facsimile device, transmitting the facsimile message from the store and forward facility to the outbound destination.

50. A method for facilitating facsimile communications between a transmitting facsimile machine and at least one paperless receiving facsimile machine, comprising steps of:
providing at least one store and forward facility having computer means for controlling operation of the store and forward facility and having mass storage means for storing facsimile messages;

assigning to each system subscriber of a plurality of system subscribers a unique destination telephone number, wherein the dialing of the unique destination telephone number of each system subscriber results in the related telephone call being switched by a switched telephone network to the at least one store and forward facility coupling the at least one store and forward facility to a switched telephone network for receiving facsimile messages from transmitting facsimile machines;

receiving over time at the at least one store and forward facility a plurality of telephone calls, each call of said plurality of telephone calls being switched to the store and forward facility by the switched telephone network as result of a sender dialing one of the unique destination telephone numbers, whereby each such received call results in an originating telephone call connection being made, receiving during the originating telephone call connections, at the facsimile store and forward facility, facsimile messages from transmitting facsimile machines;

recording received facsimile messages in the mass storage means together with information indicating the respective transmitting facsimile machine, and including steps of defining mailboxes in the mass storage means associated with particular system subscribers, and storing facsimile messages for those particular system subscribers in their respective mailboxes; and transmitting facsimile messages stored in the mass storage means to paperless receiving facsimile machines, including steps of, in response to initiation by a system subscriber, transmitting facsimile messages stored in that subscriber's mailbox to a paperless facsimile terminal machine associated with that subscriber for display on a screen.

51. The method of claim 50, further comprising the step of, in response to instructions received from a subscriber, transmitting facsimile messages stored in that subscriber's mailbox, via the public switched telephone network, to any particular facsimile device designated in the instructions by the subscriber, whereby a subscriber who is traveling or otherwise away from the fixed location of his facsimile device may have facsimile messages collected in his mailbox, and retrieve them from any location where any other facsimile device is situated.

52. The method of claim 51, and wherein the transmitting step is performed only after receipt at at least one store and forward facility of a unique PIN number of the subscriber associated with the respective mailbox.

53. The method of claim 50, wherein said storing step includes at least the step of directing facsimile messages received over an originating telephone call connection to the mailbox associated with the particular subscriber to whom the respective dialed one of the unique destination telephone numbers is assigned.

54. The method of claim 53, further comprising the step of, in response to instructions received from a subscriber, transmitting facsimile messages stored in that subscriber's mailbox at the geographically separated storage device, via the public switched telephone network, to any particular facsimile machine designated in the instructions by the subscriber, whereby a subscriber who is traveling or otherwise away from the fixed location of his facsimile machine may have facsimile messages collected in his mailbox, and retrieve them from any location where any other facsimile machine is situated.

55. The method of claim 50, further comprising the step of forwarding, while a facsimile message is still being received during an originating call connection, at least some of the message from the at least one store and forward facility to at least a second store and forward facility geographically separated from the at least one store and forward facility.

56. The method of claim 50, further including the step of, in response to instructions received from a subscriber, transmitting facsimile messages stored in that subscriber's mailbox to a facsimile machine designated by that subscriber in the instructions.

57. The method of claim 50, wherein a subscriber accessing his mailbox by a paperless facsimile terminal machine may view facsimile messages stored in his respective mailbox.

58. The method of claim 50, wherein the mailbox of a particular subscriber is defined in a mass storage remote to the at least one store and forward facility, and the directing step includes directing the facsimile message to a mailbox defined in the mass storage remote to the at least one store and forward facility.

59. The method of claim 58, further comprising the step of, in response to instructions received from a subscriber, transmitting facsimile messages stored in that subscriber's mailbox at the remote storage, via the public switched telephone network, to any particular facsimile machine designated in the instructions by the subscriber, whereby a subscriber who is traveling or otherwise away from the fixed location of his facsimile machine may have facsimile messages collected in his mailbox, and retrieve them from any location where any other facsimile machine is situated.

60. The method of claim 59, and wherein the transmitting step is performed only after receipt at a store and forward facility of a unique PIN number of the subscriber associated with the respective mailbox.

61. The method of claim 50, wherein the mailbox of a particular subscriber is defined in a mass storage local to a second store and forward facility, and further comprising the steps of directing the facsimile message to a mailbox defined in the mass storage local to the second store and forward facility.

62. The method of claim 61, further comprising the step of, in response to instructions received from a subscriber, transmitting facsimile messages stored in that subscriber's mailbox at the second store and forward facility, via the public switched telephone network, to any particular facsimile machine designated in the instructions by the subscriber, whereby a subscriber who is traveling or otherwise away from the fixed location of his facsimile machine may have facsimile messages collected in his mailbox, and retrieve them from any location where any other facsimile machine is situated.

63. The method of claim 62, and wherein the transmitting step is performed only after receipt at a store and forward facility of a unique PIN number of the subscriber associated with the respective mailbox.

64. The method of claim 50 further comprising the steps of:

granting to a paperless facsimile terminal machine access to a particular subscriber's mailbox; and wherein the transmitting step includes allowing a user at the paperless facsimile terminal machine to view a facsimile message stored in the particular subscriber's mailbox.

65. The method of claim 64, and wherein the granting and allowing steps are performed only after receipt at a store and forward facility of a unique PIN number of the subscriber associated with the respective mailbox.

66. The method of claim 50, further comprising the steps of:

receiving a call at the at least one store and forward facility over the switched telephone network from a paperless facsimile terminal machine; and granting to the paperless facsimile terminal machine access to a particular subscriber's mailbox; and wherein the transmitting step includes steps of allowing a user at the paperless facsimile terminal machine to view a facsimile message stored in the particular subscriber's mailbox.

67. The method of claim 66, and wherein the granting and allowing steps are performed only after receipt at a store and forward facility of a unique PIN number of the subscriber associated with the respective mailbox.

68. The method of claim 50, further including the steps of associating, with particular subscribers, mailboxes defined in a computer storage device geographically separated from the at least one store and forward facility, and directing facsimile messages to a mailbox defined in the computer storage device geographically separated from the at least one store and forward facility.

69. The method of claim 50, further comprising the steps of:
granting to a paperless facsimile terminal machine access to a particular subscriber's mailbox during a communication session initiated by the paperless facsimile terminal machine; and
the transmitting step includes, in response to instructions received from the remote paperless facsimile terminal machine during the communication session, transmitting facsimile messages stored in a particular subscriber's mailbox to the paperless facsimile terminal machine.

70. The method of claim 69, and wherein the granting and transmitting steps are performed only after receipt at a store and forward facility of a unique PIN number of the subscriber associated with the respective mailbox.

71. The method of claim 69, further comprising the step of providing to a subscriber at the paperless facsimile terminal machine, during the communication session, a plurality of user options selected from the group consisting of: viewing a queue of facsimile messages in the particular subscriber's mailbox; selecting facsimile messages from the queue; deleting messages from the queue; arranging the queue according to priority; reading fax messages in the particular subscriber's mailbox; redirecting a facsimile message in the particular subscriber's mailbox to any facsimile device; and redirecting a facsimile message in the particular subscriber's mailbox to a printer.

72. The method of claim 71, and wherein the granting, transmitting and providing steps are performed only after receipt at a store and forward facility of a unique PIN number of the subscriber associated with the respective mailbox.

73. The method of claim 69, further comprising the steps of providing to a subscriber at the paperless facsimile terminal machine, during the communication session, at least the user options consisting of: viewing a queue of facsimile messages in the particular subscriber's mailbox; selecting facsimile messages from the queue; deleting messages from the queue; arranging the queue according to priority; and reading fax messages in the particular subscriber's mailbox.

74. The method of claim 73, and wherein the granting and providing steps are performed only after receipt at a store and forward facility of a unique PIN number of the subscriber associated with the respective mailbox.

75. The method of claim 50, further including the steps of:
recognizing that a particular telephone call switched to a store and forward facility by the switched telephone network as a result of a particular subscriber dialing his unique destination telephone number, is not a fax transmission, and establishing a mailbox control session; and
providing to the particular subscriber during the mailbox control session a plurality of user options selected from the group consisting of: viewing a queue of facsimile messages in the particular subscriber's mailbox; selecting facsimile messages from the queue; deleting messages from the queue; arranging the queue according to priority; reading fax messages in the particular subscriber's mailbox; displaying at a computer terminal a facsimile message stored in the particular subscriber's mailbox; redirecting a facsimile message in the particular subscriber's mailbox to a facsimile device; and redirecting a facsimile message in the particular subscriber's mailbox to a printer.

76. The method of claim 75, wherein the mailbox of the particular subscriber is defined in a computer storage device geographically separated from the store and forward facility with which the originating telephone call connection was made.

77. The method of claim 75, wherein the mailbox of the particular subscriber is defined in a computer storage device geographically separated from the store and forward facility with which the mailbox control session is established.

78. The method of claim 75, wherein the providing step is performed only after receipt at a store and forward facility of a unique PIN number of the particular subscriber.

79. The method of claim 75, and wherein the store and forward facility with which the originating call connection is made and the store and forward facility with which the mailbox control session is established are the same store and forward facility.

80. The method of claim 75, wherein the providing step includes the step of providing to the subscriber at the paperless facsimile terminal machine, during the mailbox control session, at least the user options consisting of: viewing a queue of facsimile messages in the particular subscriber's mailbox; selecting facsimile messages from the queue; deleting messages from the queue; arranging the queue according to priority; and reading fax messes in the particular subscriber's mailbox.

81. The method of claim 80, further comprising the steps of, during the mailbox control session, receiving at a store and forward facility from the paperless facsimile device an outgoing facsimile message for delivery to an outbound destination and, in response to instruction received from the paperless facsimile device, transmitting the facsimile message from the store and forward facility to the outbound destination.

82. The method of claims 50, wherein the transmitting step comprises the step of, during a communication session initiated by a paperless facsimile terminal machine operating in a computer communication mode, transmitting facsimile messages stored in that subscriber's mailbox to the paperless facsimile terminal machine for display on a screen.

83. The method of claim 82, and wherein the transmitting step is performed only after receipt at a store and forward facility from the paperless facsimile terminal machine of a unique PIN number of the subscriber associated with the respective mailbox.

84. The method of claim 82, further comprising the steps of providing to the subscriber at the paperless facsimile terminal machine, during the communication session, a plurality of user options selected from the group consisting of: viewing a queue of facsimile messages in the particular subscriber's mailbox; selecting facsimile messages from the queue; deleting messages from the queue; arranging the queue according to priority; reading fax messages in the particular subscriber's mailbox; redirecting a facsimile message in the particular subscriber's mailbox to a facsimile device; and redirecting a facsimile message in the particular subscriber's mailbox to a printer.

85. The method of claim 82, further comprising the steps of providing to the subscriber at the paperless facsimile terminal machine, during the communication session, at least the user options consisting of: viewing a queue of facsimile messages in the particular subscriber's mailbox; selecting facsimile messages from the queue; deleting messages from the queue; arranging the queue according to priority; and reading fax messages in the particular subscriber's mailbox.

86. The method of claim 85, further comprising the steps of, during the communication session, receiving at a store and forward facility from the paperless facsimile terminal machinean outgoing facsimile message for delivery to an outbound destination and, in response to instruction received from the paperless facsimile terminal machine , transmitting the facsimile message from the store and forward facility to the outbound destination.

87. The method of claim 82, further comprising the steps of, during the communication session, receiving at a store and forward facility from the paperless facsimile terminal machine an outgoing facsimile message for delivery to an outbound destination and, in response to instruction received from the paperless facsimile terminal machine, transmitting the facsimile message from the store and forward facility to the outbound destination.

88. The method of claim 82, wherein mailboxes of particular subscribers are in a computer storage device geographically separated from the at least one store and forward facility, and wherein the transmitting step includes transmitting a facsimile message from a mailbox in the computer storage geographically separated from the at least one store and forward facility.

* * * * *

UNITED STATES PATENT AND TRADEMARK OFFICE
CERTIFICATE OF CORRECTION

| | | |
|---|---|---|
| PATENT NO. | : 6,643,034 B1 | Page 1 of 1 |
| APPLICATION NO. | : 09/686306 | |
| DATED | : November 4, 2003 | |
| INVENTOR(S) | : Richard J. Gordon and James R. Kennedy | |

It is certified that error appears in the above-identified patent and that said Letters Patent is hereby corrected as shown below:

On the cover Title in paragraph identified as field (63) under the caption Related U.S. Application Data after the reference to patent no. 5,449,584 on the fifth line of the paragraph but before the reference application no. 07/955,833, insert the the following reference to application no. 08/166,701: --which is a continuation of application No. 08/166,701, filed on Dec. 14, 1993, now abandoned,--.

Column 1, line 11 after the reference to patent no. 5,449,584 but before the reference application no. 07/955,833, insert the the following reference to application no. 08/166,701: --which is a continuation of application No. 08/166,701, filed on Dec. 14, 1993, now abandoned,--.

Signed and Sealed this

Twelfth Day of September, 2006

JON W. DUDAS
*Director of the United States Patent and Trademark Office*